United States Patent
Sakuyama

(10) Patent No.: US 7,609,764 B2
(45) Date of Patent: Oct. 27, 2009

(54) CODING APPARATUS, CODING METHOD, PROGRAM AND INFORMATION RECORDING MEDIUM THAT CAN SUPPRESS UNNATURAL DEGRADATION OF IMAGE QUALITY

(75) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 10/934,880

(22) Filed: Sep. 3, 2004

(65) Prior Publication Data
US 2005/0111740 A1 May 26, 2005

(30) Foreign Application Priority Data
Sep. 5, 2003 (JP) ............... 2003-314338

(51) Int. Cl.
*H04N 7/12* (2006.01)
*H04N 11/02* (2006.01)
*H04N 11/04* (2006.01)

(52) U.S. Cl. ............... 375/240.16; 375/240.19; 348/416.1

(58) Field of Classification Search ............ 375/240.03, 375/240.08, 240.16, 240.19; 348/391.1, 348/398.1, 416.6; 382/240, 243
See application file for complete search history.

(56) References Cited

U.S. PATENT DOCUMENTS

| | | | | |
|---|---|---|---|---|
| 5,485,279 A | * | 1/1996 | Yonemitsu et al. | 375/240.14 |
| 6,259,819 B1 | * | 7/2001 | Andrew et al. | 382/248 |
| 6,310,915 B1 | * | 10/2001 | Wells et al. | 375/240.03 |
| 6,580,834 B2 | * | 6/2003 | Li et al. | 382/251 |
| 7,013,049 B2 | * | 3/2006 | Sakuyama | 382/240 |
| 2002/0131645 A1 | * | 9/2002 | Hamilton | 382/251 |
| 2003/0219162 A1 | * | 11/2003 | Sano | 382/240 |
| 2004/0126020 A1 | | 7/2004 | Sakuyama et al. | |
| 2004/0264571 A1 | * | 12/2004 | Zhang et al. | 375/240.16 |

FOREIGN PATENT DOCUMENTS

| | | |
|---|---|---|
| JP | 04-369192 | 12/1992 |
| JP | 2002-064830 | 2/2002 |

OTHER PUBLICATIONS

"JPEG". Wikipedia, http://en.wikipedia.org/wiki/JPEG.*
Jiro Katto et al., "Performance Evaluation of Subband Coding and Optimization of its Filter Coefficients," Journal of Visual Communication and Image Representation, Dec. 1991, pp. 303-313, vol. 2, No. 4, Academic Press, Inc.

* cited by examiner

*Primary Examiner*—David Czekaj
*Assistant Examiner*—Jeremaiah C Huber
(74) *Attorney, Agent, or Firm*—Blakely, Sokoloff, Taylor & Zafman LLP

(57) ABSTRACT

A coding apparatus includes a coding process unit that performs one of a field-based coding process and a frame-based coding process with respect to an interlaced image. A selection unit determines, based on a degree of quantization, which of the field-based coding process and the frame-based coding process is to be performed in the coding process unit.

2 Claims, 26 Drawing Sheets

| | even | odd | even | odd | even | odd | | | | | | | | | | |
|---|---|---|---|---|---|---|---|---|---|---|---|---|---|---|---|---|
| even | LL | HL | LL | HL | LL | HL | LL | HL | LL | HL | LL | HL | LL | HL | LL | HL |
| odd | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |
| | LL | HL | LL | HL | LL | HL | LL | HL | LL | HL | LL | HL | LL | HL | LL | HL |
| | LH | HH | LH | HH | LH | HH | LH | HH | LH | HH | LH | HH | LH | HH | LH | HH |

| 2LL | 2LL | 2LL | 2LL | 2LL | 2HL | 2HL | 2HL | 2HL | 2HL | 1HL | 1HL | 1HL | 1HL | 1HL | 1HL | 1HL | 1HL | 1HH | 1HH | 1HH | 1HH | 1HH | 1HH | 1HH | 1HH |

FIG.12

RECIPROCAL OF SQUARE ROOT OF SUBBAND GAIN

|    | DECOMPOSITION LEVEL | |
|----|---|---|
|    | 2 | 1 |
| LL | 0.3 |   |
| HL | 0.5 | 1.0 |
| LH | 0.5 | 1.0 |
| HH | 1.0 | 1.9 |

FIG.13

RECIPROCAL OF SQUARE ROOT OF INVERSE ICT GAIN

|    | SQUARE ROOT | RECIPROCAL |
|----|---|---|
| Y  | 1.7 | 0.58 |
| Cb | 1.8 | 0.55 |
| Cr | 1.6 | 0.64 |

FIG.14

BASIC QUANTIZATION STEP NUMBER

CONSTANT × RECIPROCAL OF SQUARE ROOT OF SUBBAND GAIN

× RECIPROCAL OF SQUARE ROOT OF INVERSE COLOR CONVERSION GAIN

| Y | DECOMPOSITION LEVEL | |
|---|---|---|
|   | 2 | 1 |
| LL | 0.26 |   |
| HL | 0.50 | 0.99 |
| LH | 0.50 | 0.99 |
| HH | 0.98 | 1.92 |

CONSTANT × RECIPROCAL OF SQUARE ROOT OF SUBBAND GAIN

× RECIPROCAL OF SQUARE ROOT OF INVERSE COLOR CONVERSION GAIN

| Cb | DECOMPOSITION LEVEL | |
|---|---|---|
|   | 2 | 1 |
| LL | 0.25 |   |
| HL | 0.48 | 0.95 |
| LH | 0.48 | 0.95 |
| HH | 0.94 | 1.84 |

CONSTANT × RECIPROCAL OF SQUARE ROOT OF SUBBAND GAIN

× RECIPROCAL OF SQUARE ROOT OF INVERSE COLOR CONVERSION GAIN

| Cr | DECOMPOSITION LEVEL | |
|---|---|---|
|   | 2 | 1 |
| LL | 0.28 |   |
| HL | 0.55 | 1.09 |
| LH | 0.55 | 1.09 |
| HH | 1.08 | 2.12 |

CONSTANT= 1.7

FIG.18

RECIPROCAL OF SQUARE ROOT OF SUBBAND GAIN

|    | DECOMPOSITION LEVEL | |
|----|----|----|
|    | 2 | 1 |
| LL | 0.4 |  |
| HL | 0.6 | 1.0 |
| LH | 0.6 | 1.0 |
| HH | 0.9 | 1.4 |

FIG.19

SQUARE ROOT OF INVERSE RCT GAIN

|    | SQUARE ROOT | RECIPROCAL |
|----|----|----|
| Y  | 1.7 | 0.58 |
| Cb | 0.8 | 1.21 |
| Cr | 0.8 | 1.21 |

FIG.20

CONSTANT × RECIPROCAL OF SQUARE ROOT OF SUBBAND GAIN
× RECIPROCAL OF SQUARE ROOT OF INVERSE COLOR CONVERSION GAIN

| Y | DECOMPOSITION LEVEL | |
|---|---|---|
|   | 2 | 1 |
| LL | 0.44 |  |
| HL | 0.64 | 0.96 |
| LH | 0.64 | 0.96 |
| HH | 0.93 | 1.39 |

CONSTANT × RECIPROCAL OF SQUARE ROOT OF SUBBAND GAIN
× RECIPROCAL OF SQUARE ROOT OF INVERSE COLOR CONVERSION GAIN

| Cb | DECOMPOSITION LEVEL | |
|---|---|---|
|   | 2 | 1 |
| LL | 0.93 |  |
| HL | 1.34 | 2.01 |
| LH | 1.34 | 2.01 |
| HH | 1.94 | 2.91 |

CONSTANT × RECIPROCAL OF SQUARE ROOT OF SUBBAND GAIN
× RECIPROCAL OF SQUARE ROOT OF INVERSE COLOR CONVERSION GAIN

| Cr | DECOMPOSITION LEVEL | |
|---|---|---|
|   | 2 | 1 |
| LL | 0.93 |  |
| HL | 1.34 | 2.01 |
| LH | 1.34 | 2.01 |
| HH | 1.94 | 2.91 |

CONSTANT= 1.7

FIG.21

NUMBER OF BIT-PLANES TO BE DISCARDED

Y

| | | DECOMPOSITION LEVEL | |
|---|---|---|---|
| | | 2 | 1 |
| | LL | 4 | |
| | HL | 4 | 5 |
| | LH | 4 | 5 |
| | HH | 5 | 5 |

NUMBER OF BIT-PLANES TO BE DISCARDED

Cb

| | | DECOMPOSITION LEVEL | |
|---|---|---|---|
| | | 2 | 1 |
| | LL | 5 | |
| | HL | 5 | 6 |
| | LH | 5 | 6 |
| | HH | 6 | 7 |

NUMBER OF BIT-PLANES TO BE DISCARDED

Cr

| | | DECOMPOSITION LEVEL | |
|---|---|---|---|
| | | 2 | 1 |
| | LL | 5 | |
| | HL | 5 | 6 |
| | LH | 5 | 6 |
| | HH | 6 | 7 |

FIG.28

| 2LL (RESOLUTION LEVEL 0) | COMPONENT 0 (BRIGHTNESS) | BIT-PLANE OF MSB |
| --- | --- | --- |
| | | ..... |
| | | BIT-PLANE OF LSB (VICINITY) |
| | COMPONENT 1 (COLOR DIFFERENCE Cb) | BIT-PLANE OF MSB |
| | | ..... |
| | | BIT-PLANE OF LSB (VICINITY) |
| | COMPONENT 2 (COLOR DIFFERENCE Cr) | BIT-PLANE OF MSB |
| | | ..... |
| | | BIT-PLANE OF LSB (VICINITY) |
| 2HL (RESOLUTION LEVEL 1) | COMPONENT 0 (BRIGHTNESS) | BIT-PLANE OF MSB |
| | | ..... |
| | | BIT-PLANE OF LSB (VICINITY) |
| | COMPONENT 1 (COLOR DIFFERENCE Cb) | BIT-PLANE OF MSB |
| | | ..... |
| | | BIT-PLANE OF LSB (VICINITY) |
| | COMPONENT 2 (COLOR DIFFERENCE Cr) | BIT-PLANE OF MSB |
| | | ..... |
| | | BIT-PLANE OF LSB (VICINITY) |

: : :

| 1HH (RESOLUTION LEVEL 1) | COMPONENT 0 (BRIGHTNESS) | BIT-PLANE OF MSB |
| --- | --- | --- |
| | | ..... |
| | | BIT-PLANE OF LSB (VICINITY) |
| | COMPONENT 1 (COLOR DIFFERENCE Cb) | BIT-PLANE OF MSB |
| | | ..... |
| | | BIT-PLANE OF LSB (VICINITY) |
| | COMPONENT 2 (COLOR DIFFERENCE Cr) | BIT-PLANE OF MSB |
| | | ..... |
| | | BIT-PLANE OF LSB (VICINITY) |

CODING APPARATUS, CODING METHOD, PROGRAM AND INFORMATION RECORDING MEDIUM THAT CAN SUPPRESS UNNATURAL DEGRADATION OF IMAGE QUALITY

The present application claims priority to corresponding Japanese Application No. 2003-314338, filed on Sep. 5, 2003, the entire contents of which are hereby incorporated by reference.

BACKGROUND OF THE INVENTION

1. Field of the Invention

The present invention generally relates to coding of moving images and, more particularly, to a coding apparatus and a coding method that selectively apply field-based coding and frame-based coding.

2. Description of the Related Art

Moving image photographing apparatuses such as video cameras generally photograph moving images by interlaced scanning at a time interval of 1/60 sec. Methods for coding data of moving images photographed by such a video camera includes: field-based coding that codes each interlaced image (field) as is; and frame-based coding that codes a frame image synthesized from two consecutive interlaced images.

Since the scan lines of the image of each field are not successive, correlation between pixels in the perpendicular direction is weak compared to that of a frame image in which scan lines are successive. Hence, in terms of compression efficiency, frame-based coding is generally advantageous. However, in frame-based coding, when the amount of variation between the fields constituting a frame is large, edges of a moved object become comb-shaped in each line and correlation between the adjacent pixels in the perpendicular direction is significantly reduced. Thus, compression becomes difficult.

Therefore, conventionally, a technique has been proposed in which field-based coding is performed on a portion with large movement, whereas frame-based coding is performed on a part with small movement (refer to Japanese Laid-Open Patent Application No. 2002-64830 and Japanese Patent Gazette No. 2507199).

As mentioned above, which of frame-based coding and field-based coding is better is determined on case-by-case basis. However, frame-based coding is generally used because it is complicated to determine the amount of movement. In the case of applying frame-based coding, a problem occurs in that, when movement between fields is large, coding efficiency is reduced due to the above-mentioned comb-shapes and specific unnatural image degradation occurs.

A description is given of the image degradation. FIG. 1-(a) shows an interlaced image of the (n)th field, FIG. 1-(b) shows the interlaced image of the (n+1)th field after 1/60 second, FIG. 1-(c) shows a non-interlaced image of the frame obtained by synthesizing the interlaced images of the above-mentioned two fields. When an object moves rightward between the two fields as shown in FIG. 1, the right and left edge portions of the object on the frame image form comb-like shapes since edge portions in each scan line are shifted for plural pixels. FIG. 1-(d) shows a part of the comb-like edge portions in an enlarged manner. In FIG. 1-(d), "L" corresponds to the amount of movement between the fields.

In frame-based coding, the above-mentioned "comb-like shapes" cause a reduction in coding efficiency and specific unnatural image degradation.

Referring to FIG. 2, a further description is given of the unnatural image degradation. In a case where the vertical line located at the position shown in FIG. 2-(a) in the (n)th field moves to the position shown in FIG. 2-(b) in the (n+1)th field, the vertical line becomes two dotted lines as shown in FIG. 2-(c) in the frame obtained by synthesizing both fields. When the frame is decoded after being subjected to frame-based coding, under the influence of quantization (including truncation described below) at the time of coding, dots forming each of the dotted lines seem to be connected via dots of subtle colors as shown in FIG. 2-(d). Accordingly, two dotted lines appear in each of the fields shown in FIG. 2-(e) and FIG. 2-(f) decomposed from the decoded frame. As a result, when the decoded frame is decomposed into fields and displayed in an interlaced manner on, for example, a television receiver, the original vertical line and an "after-image" vertical line thereof appear in each of the fields. Thus, the single original vertical line appears to be two vertical lines. FIG. 2 shows the case where the vertical line moves. In cases where not a line but a surface moves, the surface appears to be doubled or shifted to the right and left. Such a phenomenon is called "after-image phenomenon" in this specification.

SUMMARY OF THE INVENTION

A coding apparatus, coding method, program and information recording medium that can suppress unnatural degradation of image quality are described. In one embodiment, the apparatus comprises a coding process unit to perform one of a field-based coding process and a frame-based coding process with respect to an interlaced image, and a selection unit to determine, based on a degree of quantization, which of the field-based coding process and the frame-based coding process is to be performed in the coding process unit.

BRIEF DESCRIPTION OF THE DRAWINGS

FIG. 5 is a schematic diagram showing coefficient arrays after filtering in a vertical direction;

FIG. 6 a schematic diagram showing coefficient arrays after filtering in a horizontal direction;

FIG. 7 is a schematic diagram showing a deinterleaved coefficient array;

FIG. 8 is a schematic diagram showing a deinterleaved coefficient array after a second wavelet transform;

FIG. 12 is a table showing reciprocals of square roots of subband gains of a 9×7 wavelet transform;

FIG. 13 is a table showing square roots of inverse ICT gains and reciprocals thereof;

FIG. 14 shows tables of basic quantization step number;

FIG. 18 is a table of reciprocals of square roots of subband gains of a 5×3 wavelet transform;

FIG. 19 is a table showing square roots of inverse RCT gains and reciprocals thereof;

FIG. 20 shows tables of values corresponding to basic quantization step numbers in the case of a 5×3 wavelet transform;

FIG. 21 shows tables of truncation number in the case of using a 5×3 wavelet transform (k=32);

FIG. 28 is a schematic diagram showing a structure of codes.

DETAILED DESCRIPTION OF THE PREFERRED EMBODIMENTS

Figure 1:
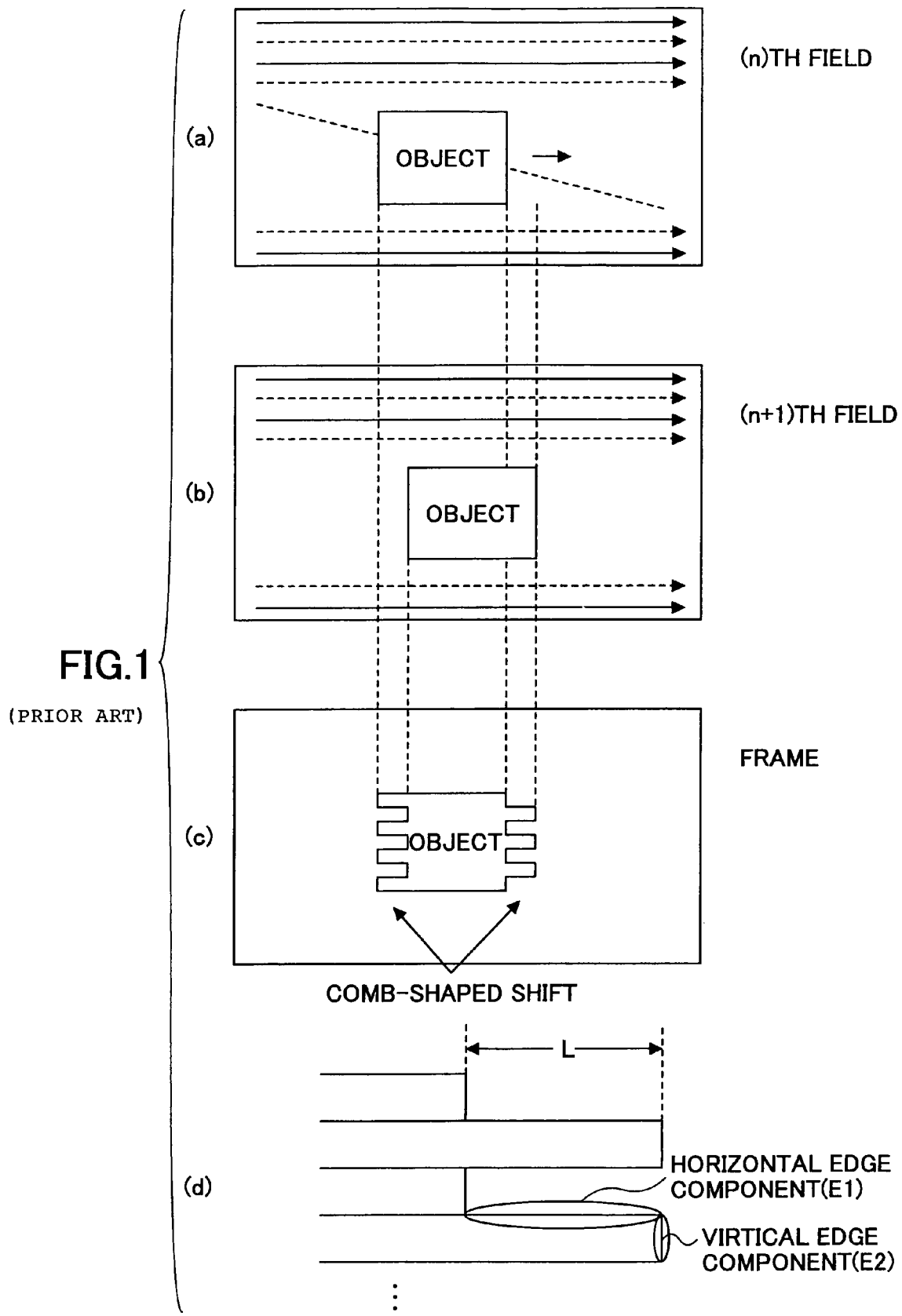
FIG. 1 is a schematic diagram for illustrating movement between fields and comb-shapes.

Embodiments of the present invention include an improved and useful coding apparatus, coding method, program and information recording medium in which one or more of the above-mentioned problems are eliminated.

Another and more specific embodiment of the present invention includes a coding apparatus and a coding method that selectively apply field-based coding or frame-based coding in order to suppress unnatural image degradation such as the after-image phenomenon in coding of interlaced images.

According to one embodiment of the present invention, a coding apparatus includes:

a coding process unit that performs one of a field-based coding process and a frame-based coding process with respect to an interlaced image; and a selection unit that determines, based on a degree of quantization, which of the field-based coding process and the frame-based coding process is to be performed in the coding process unit.

According to the above-mentioned embodiment of the present invention, even if the degree of quantization is high, it is possible to suppress degradation of image quality.

Recently, a method called "bit-plane coding" is often used. In the bit-plane coding method, frequency coefficients are decomposed into bit-planes, and each of the bit-planes is independently coded. A typical example of such a coding method is JPEG 2000. In JPEG 2000, a typical process flow in the case of using a 5×3 wavelet transform is as follows.

wavelet transform of an original signal into subbands→only necessary higher bit-planes (or higher sub-bit-planes) of wavelet coefficients are coded for each subband, or wavelet transform of an original signal into subbands→all bit-planes of wavelet coefficients are coded for each subband→discard codes of unnecessary lower bit-planes (or lower sub-bit-planes)

Here, "sub-bit-plane" indicates a subset of a single bit-plane. In the above-mentioned bit-plane coding, it is possible to improve a compression rate with respect to original data by: (i) entropy-coding only necessary higher bit-planes (or sub-bit-planes) (discard unnecessary lower bit-planes or sub-bit-planes) and (ii) entropy-coding excessive (typically, all) bit-planes, and thereafter discard entropy codes of unnecessary lower bit-planes (or sub-bit-planes). In this embodiment, both (i) and (ii) are referred to as truncation.

As can be appreciated from the above description, truncation has an effect of quantizing frequency coefficients in consequence. Accordingly, the degree of truncation reflects the degree of quantization.

According to another embodiment of the present invention, a coding apparatus includes:

a coding process unit that performs one of a field-based coding process and a frame-based coding process with respect to an interlaced image; and a selection unit that determines, based on a degree of truncation, which of the field-based coding process and the frame-based coding process is to be performed in the coding process unit.

Additionally, according to the above-mentioned embodiment of the present invention, even if the degree of truncation is high, it is possible to suppress unnatural degradation of image quality.

In addition, a typical process flow in the case of using a 9×7 wavelet transform in JPEG 2000 is as follows.

wavelet transform of an original signal to subbands→linear quantization of wavelet coefficients for each subband→code only necessary higher bit-planes (or higher sub-bit-planes) of the quantized wavelet coefficients for each subband In this case, both quantization of frequency coefficients and truncation reflect the total degree of quantization.

Additionally, according to another embodiment of the present invention, a coding apparatus includes:

a coding process unit that performs one of a field-based coding process and a frame-based coding process with respect to an interlaced image; and a selection unit that determines, based on a degree of quantization and a degree of truncation, which of the field-based coding process and the frame-based coding process is to be performed in the coding process unit.

According to the above-mentioned embodiment of the present invention, it is possible to suppress unnatural degradation of image quality in consideration of both quantization and truncation.

Additionally, according to another embodiment of the present invention, a coding apparatus includes:

a coding process unit that performs one of a field-based coding process and a frame-based coding process with respect to an interlaced image; and a selection unit that determines, based on a compression rate, which of the field-based coding process and the frame-based coding process is to be performed in the coding process unit.

According to the above-mentioned embodiment of the present invention, even if the compression rate is high, it is possible to suppress unnatural degradation of image quality.

Figure 2:
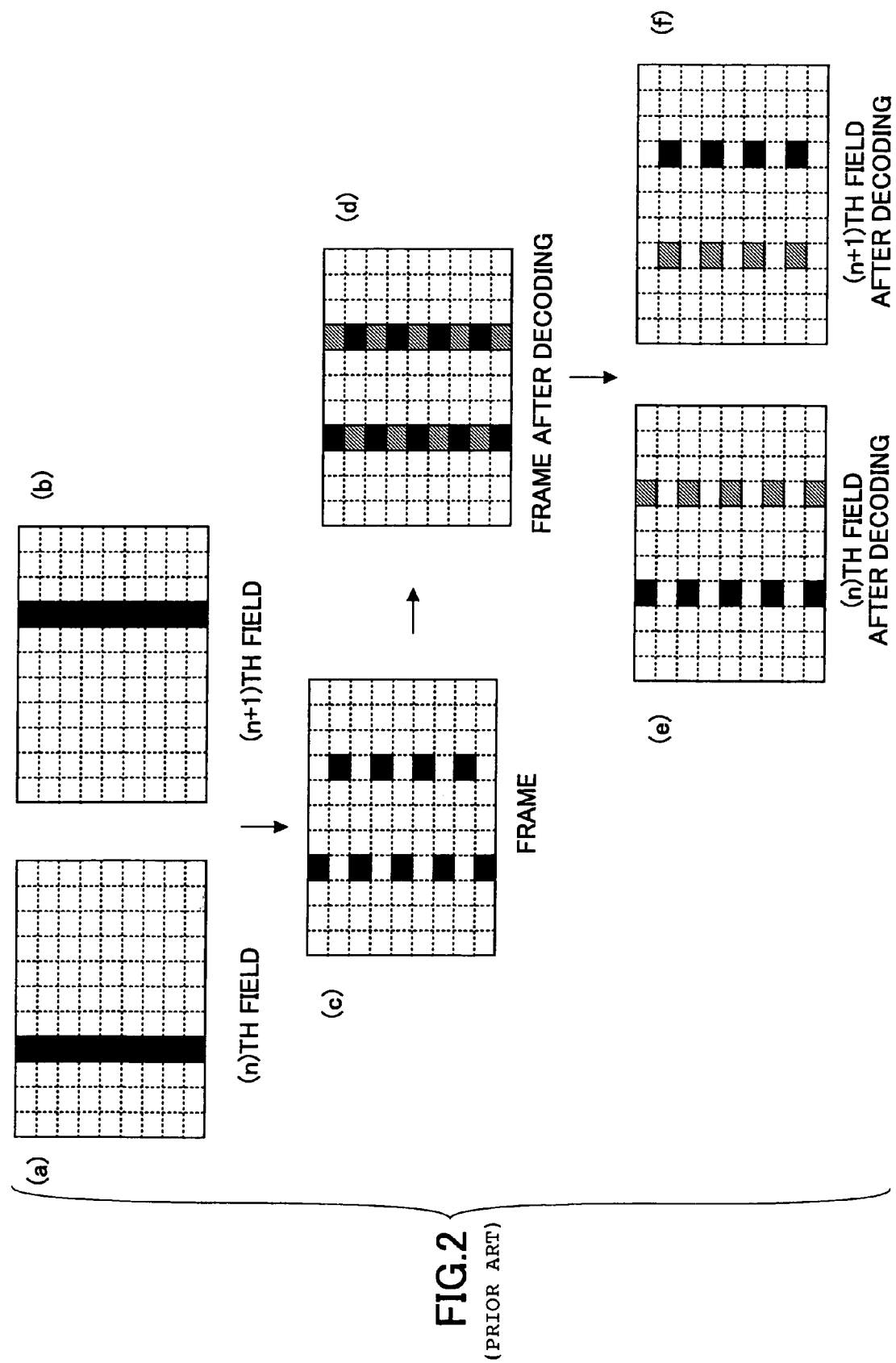
FIG. 2 is a schematic diagram for illustrating "after-image phenomenon" caused by movement between fields.

In addition, as is clear from FIG. 2, in a frame, a "comb-shape" forms a frequency band in which the variation in pixel value of a single pixel becomes highest. Thus, when considering the degree of quantization or truncation, the degree of quantization or truncation with respect to high frequency coefficients should be noticed.

In the above-mentioned coding apparatuses, the degree of quantization and/or the degree of truncation may be related to a higher range. Accordingly, even if the degree of quantization in a higher range and/or truncation in a higher range is high, it is possible to suppress unnatural degradation of image quality.

In the case where the above-mentioned frequency transformation is wavelet transform, the frequency band indicates each decomposition level, and the lower the decomposition level is, the higher the frequency becomes.

In the above-mentioned coding apparatuses, the degree of quantization and/or the degree of truncation may be related to a wavelet transform at a decomposition level 1. That is, by using the degree of quantization of the decomposition level 1 and the degree of truncation as the degree of quantization in a higher range and the degree of truncation in a higher range, respectively, it is possible to more easily perform coding while suppressing unnatural degradation of image quality.

Additionally, according to another embodiment of the present invention, a coding method includes:

performing one of a field-based coding process and a frame-based coding process with respect to an interlaced image; and selecting, based on a degree of quantization, which of the field-based coding process and the frame-based coding process is to be performed.

Additionally, according to another embodiment of the present invention, a coding method includes:

performing one of a field-based coding process and a frame-based coding process with respect to an interlaced image; and selecting, based on a degree of truncation, which of the field-based coding process and the frame-based coding process is to be performed.

Additionally, according to another embodiment of the present invention, a coding method includes:

performing one of a field-based coding process and a frame-based coding process with respect to an interlaced image; and selecting, based on a degree of quantization and a degree of truncation, which of the field-based coding process and the frame-based coding process is to be performed.

Additionally, according to another embodiment of the present invention, a coding method includes:

performing one of a field-based coding process and a frame-based coding process with respect to an interlaced image; and selecting, based on a compression rate, which of the field-based coding process and the frame-based coding process is to be performed.

In the above-mentioned coding methods, the degree of quantization and/or the degree of truncation may be related to a high range.

Additionally, in the above-mentioned coding methods, the degree of quantization and/or the degree of truncation may be related to a wavelet transform at a decomposition level 1. Accordingly, it is possible to suppress unnatural degradation of image quality.

Additionally, according to another embodiment of the present invention, there is provided a program for realizing, on a computer, a coding apparatus or a coding method according an embodiment of the present invention.

Additionally, according to another embodiment of the present invention, there is provided an information recording medium recording such a program thereon.

According to the above-mentioned embodiments of the present invention, it is possible to perform an embodiment of the present invention by using a computer.

Other features and advantages of the present invention will become more apparent from the following detailed description when read in conjunction with the drawings.

The applicant of the present application has invented inventions related to the present invention and has filed them as Japanese Patent Applications No. 2002-289807, No. 2002-300468, No. 2002-300476 and No. 2002-360809. The brief summary of the invention of each of the above-mentioned patent applications is as follows.

Japanese Patent Application No. 2002-289807

In frame-based coding of an interlaced image (field), a two-dimensional wavelet transform of a frame (non-interlaced) image is performed. Paying attention to the fact that 1LH subband coefficients are strongly influenced by the comb-shapes due to movement between fields, the amount of movement (movement speed) between fields is determined based on at least the values of the 1LH subband coefficients or at least the amount of codes of the 1LH subband coefficients.

Japanese Patent Application No. 2002-300468

In frame-based coding of an interlaced image, a two-dimensional wavelet transform of a frame image is performed. In order to determine the amount of movement between fields with precision even when the amount of movement is large but a moving object is small, an image is divided into sub-blocks (for example, code blocks), and the amount of movement between fields in the image is determined based on at least the values or the amount of codes of 1LH subband coefficients of each of the sub-blocks.

Japanese Patent Application No. 2002-300476

In frame-based coding of an interlaced image, a two-dimensional wavelet transform of a frame image is performed. The image is divided into sub-blocks, and the amount of movement between fields is determined based on at least the values or the amount of codes of 1LH subband coefficients of each of the sub-blocks. When a camera photographing a moving image is still, the image includes a moving part (including a high-speed moving part and a low-speed moving part) and a non-moving part. With the determination for each of the sub-blocks, it is possible to determine the amount of movement in each of such parts.

Japanese Patent Application No. 2002-360809

In frame-based coding of an interlaced image, quantization of frequency coefficients obtained by frequency transformation (for example, wavelet transform) of a frame image, truncation of the frequency coefficients subjected to quantization, or truncation of codes is controlled in accordance with the amount of movement between fields. Thereby, unnatural image degradation is suppressed.

Generally, in many cases, coding (compression) of an image is performed in accordance with the process flow of:

(A) conversion of image data to frequency domain coefficients→quantization of coefficients of each frequency→entropy coding of coefficients subjected to quantization;

(B) conversion of image data to frequency domain coefficients→quantization of coefficients of each frequency→entropy coding of only finally necessary parts in relation to coefficients subjected to quantization, such as necessary bit-planes or sub-bit-planes; or (C) conversion of image data to frequency domain coefficients→quantization of coefficients of each frequency→entropy coding of coefficients subjected to quantization→discarding of finally unnecessary entropy codes (truncation of entropy codes).

In the process flow (B), those coefficients that are not the targets of entropy coding are as good as being discarded, which is truncation of coefficients. In this specification, such truncation of coefficients as well as truncation (also called post-quantization) of codes in the process flow (C) are generically referred to as "truncation".

In order to suppress the above-mentioned "after-image phenomenon", quantization or truncation that detects the amount of comb-shapes and lets the comb-shapes remain may be performed in the above-mentioned process flows. However, conventionally, in many cases, quantization or truncation has been uniformly performed on images irrespective of the amount of comb-shapes. Even in cases where different quantization or truncation is applied for each image, to apply such quantization or truncation by considering the degree of comb-shapes is not conventionally done.

The applicant of the present application has proposed the inventions in which the degree of the amount of comb-shapes is reflected in quantization or truncation in Japanese Patent Applications No. 2002-289807, No. 2002-300468, No. 2002-300476 and No. 2002-360809.

With such methods, it is possible to suppress generation of unnatural after-image phenomenon in frame-based coding. However, since comb-shapes, i.e., high frequency components, are positively left, there is a possibility that the applicable compression rate may be limited. This is because, in order to achieve a very high total compression rate, even comb-shapes reproduced at first need to be finally quantized and, as a result, the comb-shapes may not be left at a very high compression rate.

However, there is a method that leaves comb-shapes even at a very high compression rate. In such a method, "comb-shapes are formed after quantization", that is, field-based coding is performed. In other words, it is also effective to perform switching in which general frame-based coding is performed up to a certain compression rate and field-based coding is performed at the certain compression rate and higher.

In terms of quantization that does not leave comb-shapes, the above-mentioned switching is fundamentally based on the amount of quantization (degree of quantization). Thus, when switching between frame-based coding and field-based coding, not only the amount of movement but also the amount (degree) of quantization serves as effective determinants.

Generally, coding of a signal referred to as transform coding follows the procedure of: frequency transformation of an original signal to subbands→quantization of "frequency domain coefficients" constituting the subbands→entropy coding of the coefficients subjected to quantization. Here, a subband is an aggregate of the "frequency domain coefficients" categorized into each frequency band. The "frequency domain coefficients (hereinafter referred to as frequency coefficients)" are DCT coefficients when the frequency transform is DCT or wavelet coefficients when the frequency transform is wavelet transform. In addition, as is generally known, the above-mentioned quantization is performed to improve the compression rate of data. The typical example of the quantization is linear quantization in which coefficients are divided by a constant called a quantization step number. As is generally known, the above-mentioned quantization is performed to improve the compression rate of data.

As is clear from the example, the degree of quantization can be determined based on the denominator of the division at the time of quantization (quantization step number in linear quantization).

It is assumed that JPEG 2000 is applied in the best modes of the present invention. Hence, first, a description is given of the overview of the JPEG 2000 algorithm. It should be noted that, though JPEG 2000 is preferred in a coding method applied to the present invention, JPEG 2000 is not a limitation.

Figure 3:
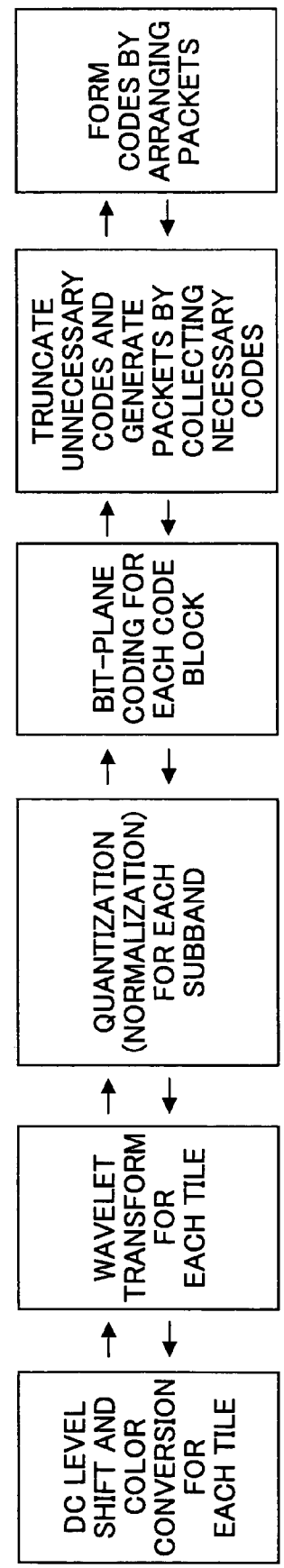
FIG. 3 is a block diagram showing flows of compression/decompression processes in JPEG 2000.

FIG. 3 is a block diagram showing basic flows of coding (compression) and decoding (decompression) processes of JPEG 2000.

When compressing a color image constituted by 3 components of R, G and B, for example, each of the components is divided into one or more non-overlapping tiles, and each tile of each component is processed. First, each tile is subjected to DC level shifting and component transform (color conversion) to brightness/color difference component. Then, a wavelet transform (discrete wavelet transform) is performed on each tile of each component. Wavelet coefficients are subjected to quantization in each subband if necessary, and thereafter subjected to entropy coding in units of bit-planes (to be accurate, a bit-plane is coded by being divided into three sub-bit-planes). Then, unnecessary codes are truncated, packets are generated by putting necessary codes together, the packets are arranged in a predetermined order, and necessary tags or tag information is added to the packets. In the aforementioned manner, a code stream (coded data) in a predetermined format is formed. In a case where truncation is performed on coefficients, only necessary higher bit-planes are coded.

The decoding (decompression) process is opposite to the compression process. A code stream is decomposed into each tile of each component. Wavelet coefficients for each component obtained by entropy decoding and inverse quantization in units of bit-planes are subjected to an inverse wavelet transform. Then, inverse color conversion and inverse DC level shifting are performed, thereby obtaining RGB pixel values.

The transform equation and the inverse transform equation of DC level shifting of JPEG 2000 are as follows.

$$I(x,y) \leftarrow I(x,y) - 2^{Ssiz(i)} \text{ forward transform}$$

$$I(x,y) \leftarrow I(x,y) - 2^{Ssiz(i)} \text{ inverse transform} \quad (1)$$

It should be noted that $Ssiz(i)$ is the bit depth of each component $i$ ($i=0$, 1 or 2 in the case of a RGB image) of an original image.

In the case of a positive number such as a RGB signal value, the DC level shifting is performed as follows: in forward transform, level shifting of subtracting half of the dynamic range of a signal from each signal value is performed; and in inverse transform, level shifting of adding half of the dynamic range of a signal to each signal value is performed. It should be noted that the level shifting is not applied to a signed integer such as a Cb signal and a Cr signal of a YCbCr signal.

In JPEG 2000, the reversible component transformation (RCT) and the irreversible component transformation (ICT) are defined as component transformation (color conversion).

The forward transform and the inverse transform of the RCT are expressed by the following set of equations (2).

forward transform $$Y_0(x,y) = \text{floor}((I_0(x,y) + 2*(I_1(x,y) + I_2(x,y))/4)$$

$$Y_1(x,y) = I_2(x,y) - I_1(x,y)$$

$$Y_2(x,y) = I_0(x,y) - I_1(x,y)$$

inverse transform $$I_1(x,y)=Y_0(x,y)-\text{floor}((Y_2(x,y)+Y_1(x,y))/4)$$

$$I_0(x,y)=Y_2(x,y)+I_1(x,y)$$

$$I_2(x,y)=Y_1(x,y)-I_1(x,y) \quad (2)$$

In the above equations, I represents an original signal and Y represents a transformed signal. In the case of a RGB signal, 0=R, 1=G, and 2=B in an I signal, and 0=Y, 1=Cb, and 2=Cr in a Y signal. Floor(x) is a function replacing an actual number x with an integer that does not exceed x and is closest to x.

The forward transform and the inverse transform of the ICT are expressed by the following set of equations (3).

forward transform $$Y_0(x,y)=0.299*I_0(x,y)+0.587*I_1(x,y)+0.144*I_2(x,y)$$

$$Y_1(x,y)=-0.16875*I_0(x,y)-0.33126*I_1(x,y)+0.5*I_2(x,y)$$

$$Y_2(x,y)=0.5*I_0(x,y)-0.41869*I_0(x,y)-0.08131*I_2(x,y)$$

inverse transform $$I_0(x,y)=Y_0(x,y)+1.402*Y_2(x,y)$$

$$I_1(x,y)=Y_0(x,y)+0.34413*Y_1(x,y)-0.71414*Y_2(x,y)$$

$$I_2(x,y)=Y_0(x,y)+1.772*Y_1(x,y) \quad (3)$$

In the above equations, I represents an original signal and Y represents a transformed signal. In the case of a RGB signal, 0=R, 1=G, and 2=B in an I signal, and 0=Y, 1=Cb, and 2=Cr in a Y signal.

JPEG 2000 adopts a reversible 5×3 wavelet transform and an irreversible 9×7 wavelet transform. In a 5×3 wavelet transform, an output (low-pass coefficient) of a single low-pass filter is obtained by using 5 pixels, and an output (high-pass coefficient) of a single high-pass filter is obtained by using 3 pixels. In a 9×7 wavelet transform, an output (low-pass coefficient) of a single low-pass filter is obtained by using 9 pixels, and an output (high-pass coefficient) of a single high-pass filter is obtained by using 7 pixels. A 5×3 wavelet transform and a 9×7 wavelet transform are different mainly in the filter range but similar in that low-pass filtering is performed with respect to even number positions and high-pass filtering is performed with respect to odd number positions.

The transform equations of a 5×3 wavelet transform are as follows.

(forward transform)

$$C(2i+1)=P(2i+1)-\text{floor}((P(2i)+P(2i+2))/2) \text{ [step 1]}$$

$$C(2i)=P(2i)+\text{floor}(((C(2i-1)+C(2i+1)+2)/4) \text{ [step 2]} \quad (4)$$

(inverse transform)

$$P(2i)=C(2i)-\text{floor}((C(2i-1)+C(2i+1)+2)/4) \text{ [step 1]}$$

$$P(2i+1)=C(2i+1)-\text{floor}((P(2i)+P(2i+2))/2) \text{ [step 2]} \quad (5)$$

The transform equations of a 9×7 wavelet transform are as follows.

(forward transform)

$$C(2n+1)=P(2n+1)+\alpha*(P(2n)+P(2n+2)) \text{ [step 1]}$$

$$C(2n)=P(2n)+\beta*(C(2n-1)+C(2n+1)) \text{ [step 2]}$$

$$C(2n+1)=C(2n+1)+\gamma*(C(2n)+C(2n+2)) \text{ [step 3]}$$

$$C(2n)=C(2n)+\delta*(C(2n-1)+C(2n+1)) \text{ [step 4]}$$

$$C(2n+1)=K*C(2n+1) \text{ [step 5]}$$

$$C(2n)=(1/K)*C(2n) \text{ [step 6]} \quad (6)$$

(inverse transform)

$$P(2n)=K*C(2n) \text{ [step 1]}$$

$$P(2n+1)=(1/K)*C(2n+1) \text{ [step 2]}$$

$$P(2n)=X(2n)-\delta*(P(2n-1)+P(2n+1)) \text{ [step 3]}$$

$$P(2n+1)=P(2n+1)-\gamma*(P(2n)+P(2n+2)) \text{ [step 4]}$$

$$P(2n)=P(2n)-\beta*(P(2n-1)+P(2n+2)) \text{ [step 5]}$$

$$P(2n)=P(2n+1)-\alpha*(P(2n)+P(2n+2)) \text{ [step 6]} \quad (7)$$

It should be noted that:
α=1.586134342059924;
β=−0.052980118572961;
γ=0.882911075530934;
δ=0.443506852043971; and
K=1.230174104914001.

As an example, referring to FIGS. 4 through 8, a description is given of a process of performing a 5×3 wavelet transform on a 16×16 monochrome image in two dimensions (vertical direction and horizontal direction).

Figure 4:
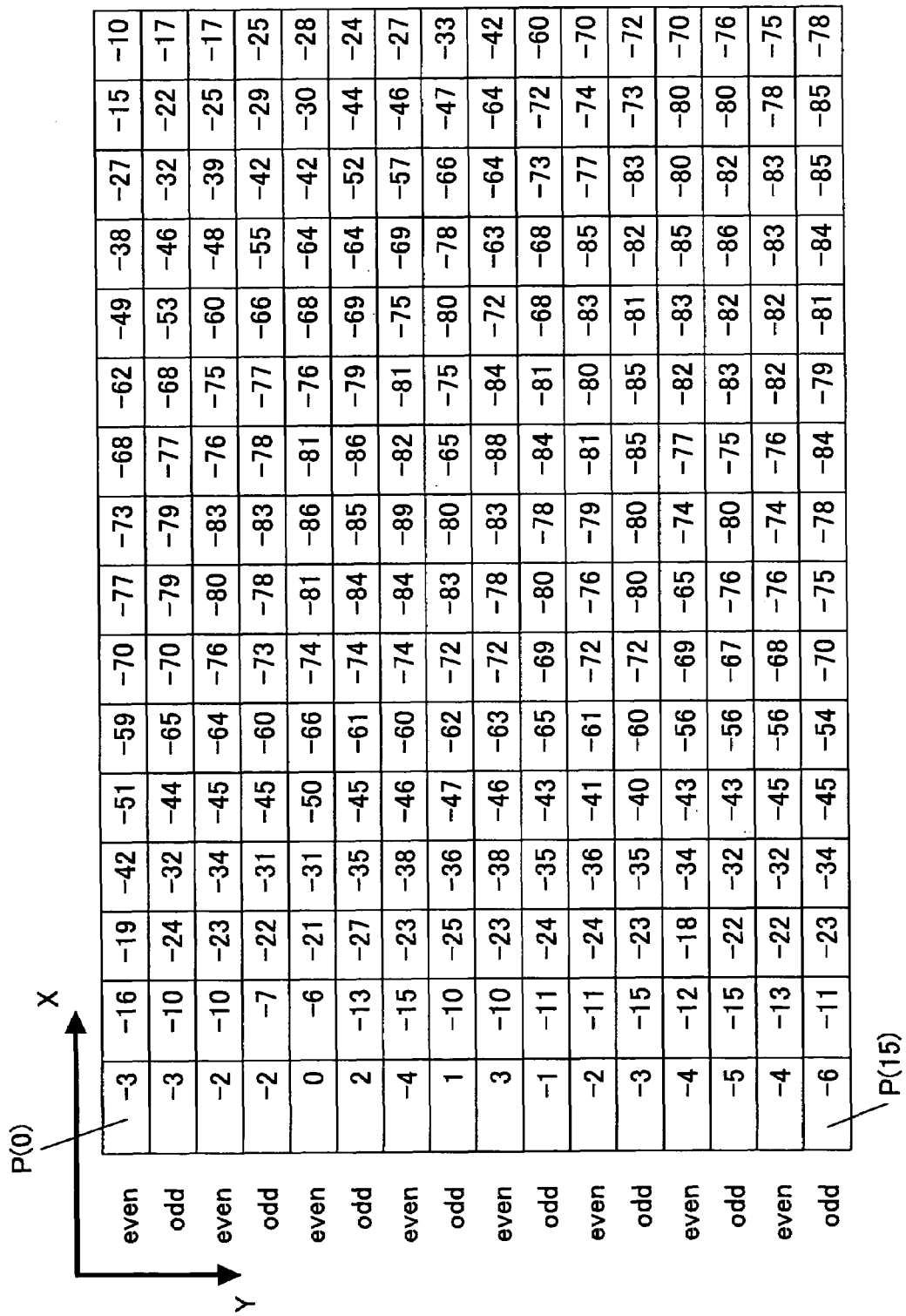
FIG. 4 is a schematic diagram showing an original image and a coordinate system for illustrating two-dimensional wavelet transform.

The X-Y coordinate as shown in FIG. 4 is used, and the pixel value of a pixel whose Y-coordinate is y with respect to a certain X-coordinate is represented by P(y) (0≦y≦15). In JPEG 2000, first, a coefficient C (2i+1) is obtained by performing high-pass filtering with respect to those pixels whose Y-coordinates are odd numbers (y=2i+1) in the vertical direction (Y-coordinate direction). Then, a coefficient C(2i) is obtained by performing low-pass filtering with respect to those pixels whose Y-coordinates are even numbers (y=2i) (this is performed on all X-coordinates). In the above-mentioned set of forward transform equations (4), the equation of step 1 represents a high-pass filter, and the equation of step 2 represents a low-pass filter.

It should be noted that, in an end portion of an image, adjacent pixels may not exist with respect to a center pixel. In such a case, a pixel value is compensated according to a predetermined rule. However, since this is not fundamentally related to the present invention, a detailed description thereof is omitted.

Figure 5:
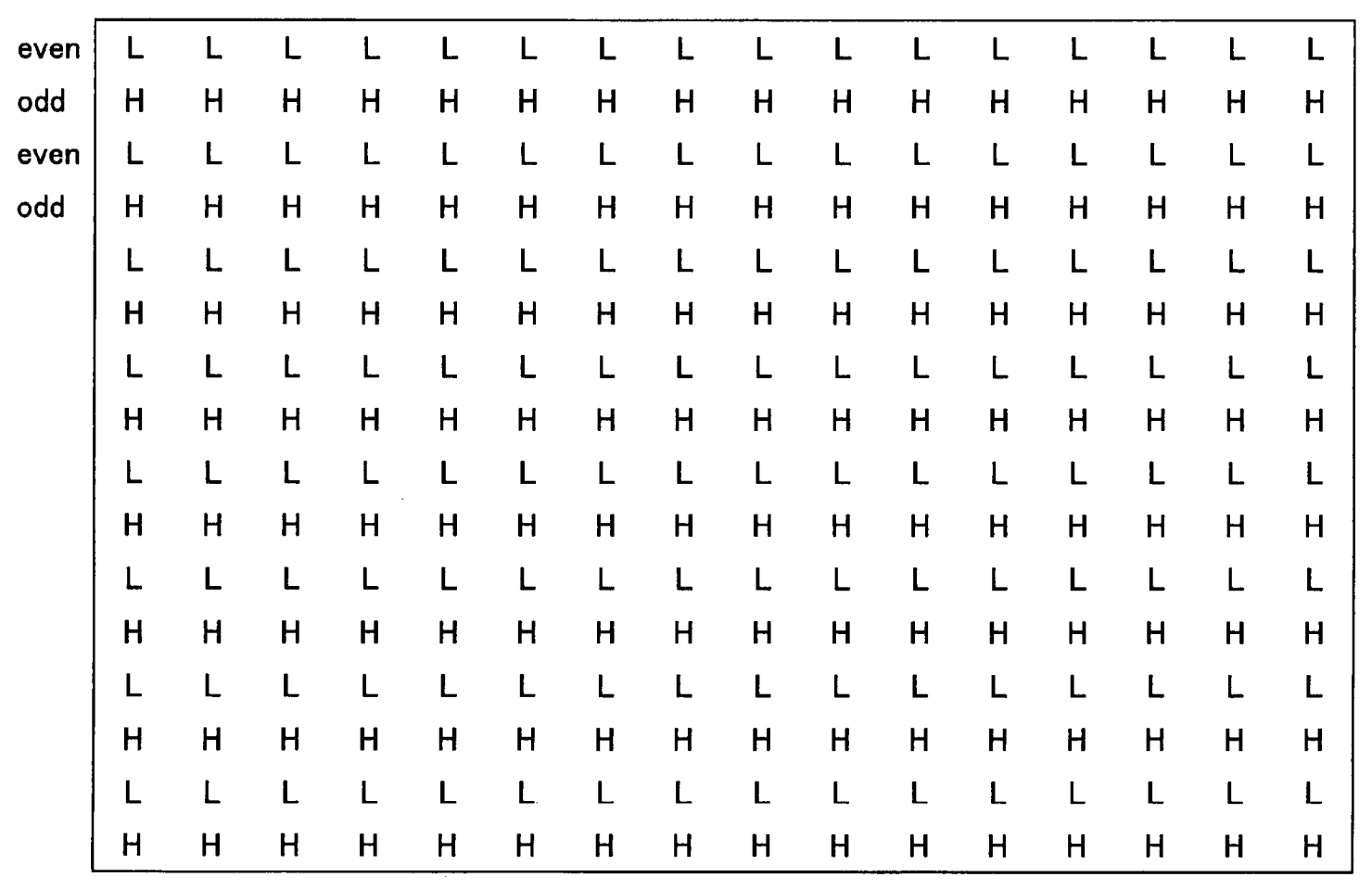

For simplicity, if a coefficient obtained by high-pass filtering is represented by H and a coefficient obtained by low-pass filtering is represented by L, the image of FIG. 4 is transformed to an array (coefficient array) of the coefficients L and H as shown in FIG. 5.

Subsequently, filtering is performed on the coefficient array of FIG. 5 in the horizontal direction: high-pass filtering is performed with respect to those coefficients whose X-coordinates are odd numbers (x=2i+1), and then low-pass filtering is performed with respect to those coefficients whose X-coordinates are even numbers (x=2i) (This filtering is performed on all ys. In this case, it is assumed that P(2i), for example, in the set of forward transform equations (4) represents a coefficient value.).

For simplicity, if a coefficient obtained by low-pass filtering with respect to the coefficient L is represented by LL, a coefficient obtained by performing high-pass filtering with respect to the coefficient L is represented by HL, a coefficient obtained by performing low-pass filtering with respect to the coefficient H is represented by LH, and a coefficient obtained by performing high-pass filtering with respect to the coefficient H is represented by HH, the coefficient array of FIG. 5 is transformed to a coefficient array as shown in FIG. 6. Here, a group of coefficients having the same symbol is called a subband, and the coefficient array of FIG. 6 is composed of four subbands.

In the aforementioned manner, a first wavelet transform (first decomposition) ends. When only the coefficients LL are aggregated (when coefficients are aggregated for each subband as shown in FIG. 7 and only a LL subband is extracted), an "image" is obtained whose resolution is ½ of that of the original image (Such classification for each subband is called deinterleaving and arrangement as shown in FIG. 6 is called interleaving).

A second wavelet transform may be performed in a manner similar to that mentioned above by assuming the LL subband as an original image. When the second wavelet transform is performed and coefficients are rearranged, a coefficient array as shown in FIG. 8 is obtained.

Figure 7:
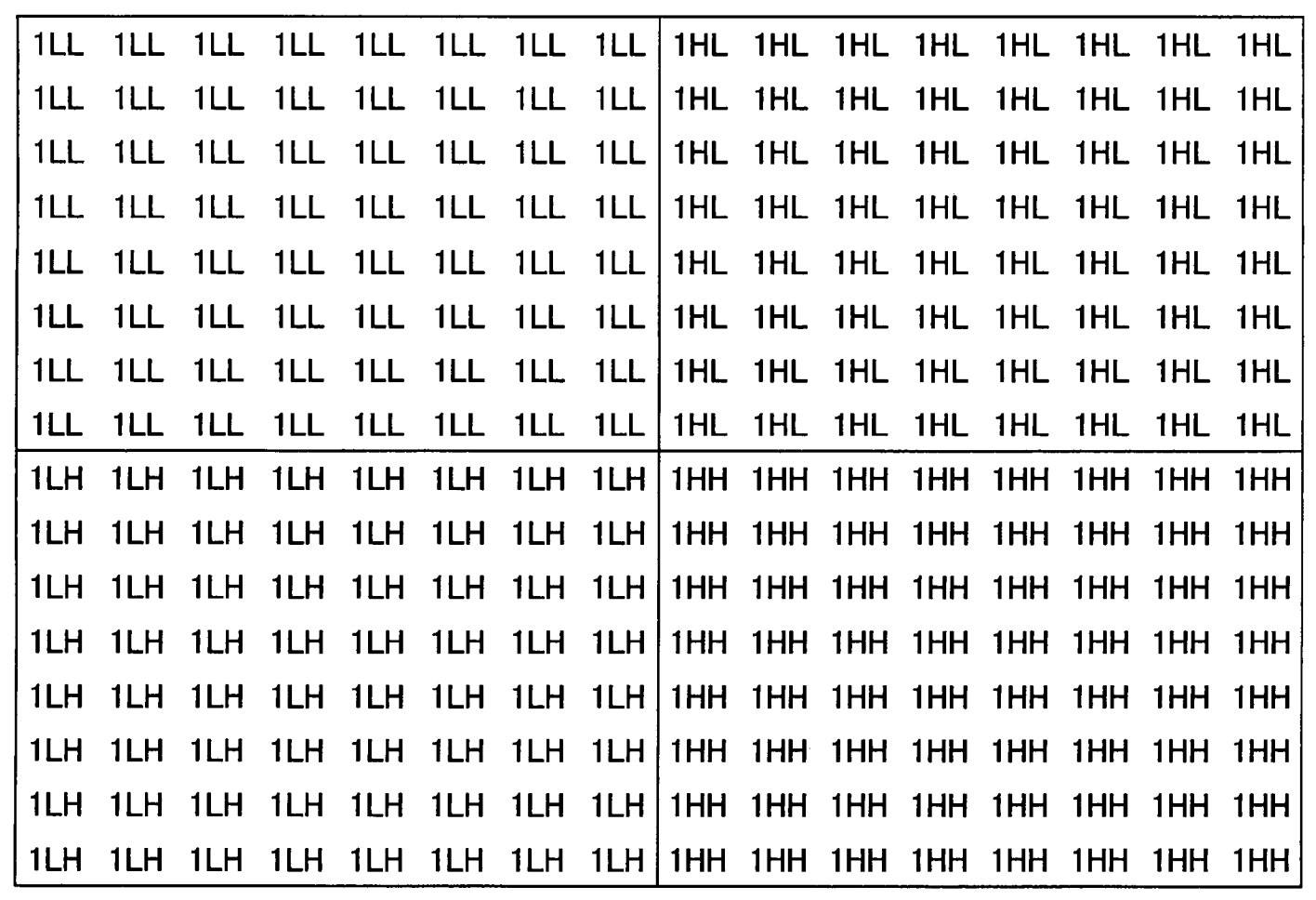
Figure 9:
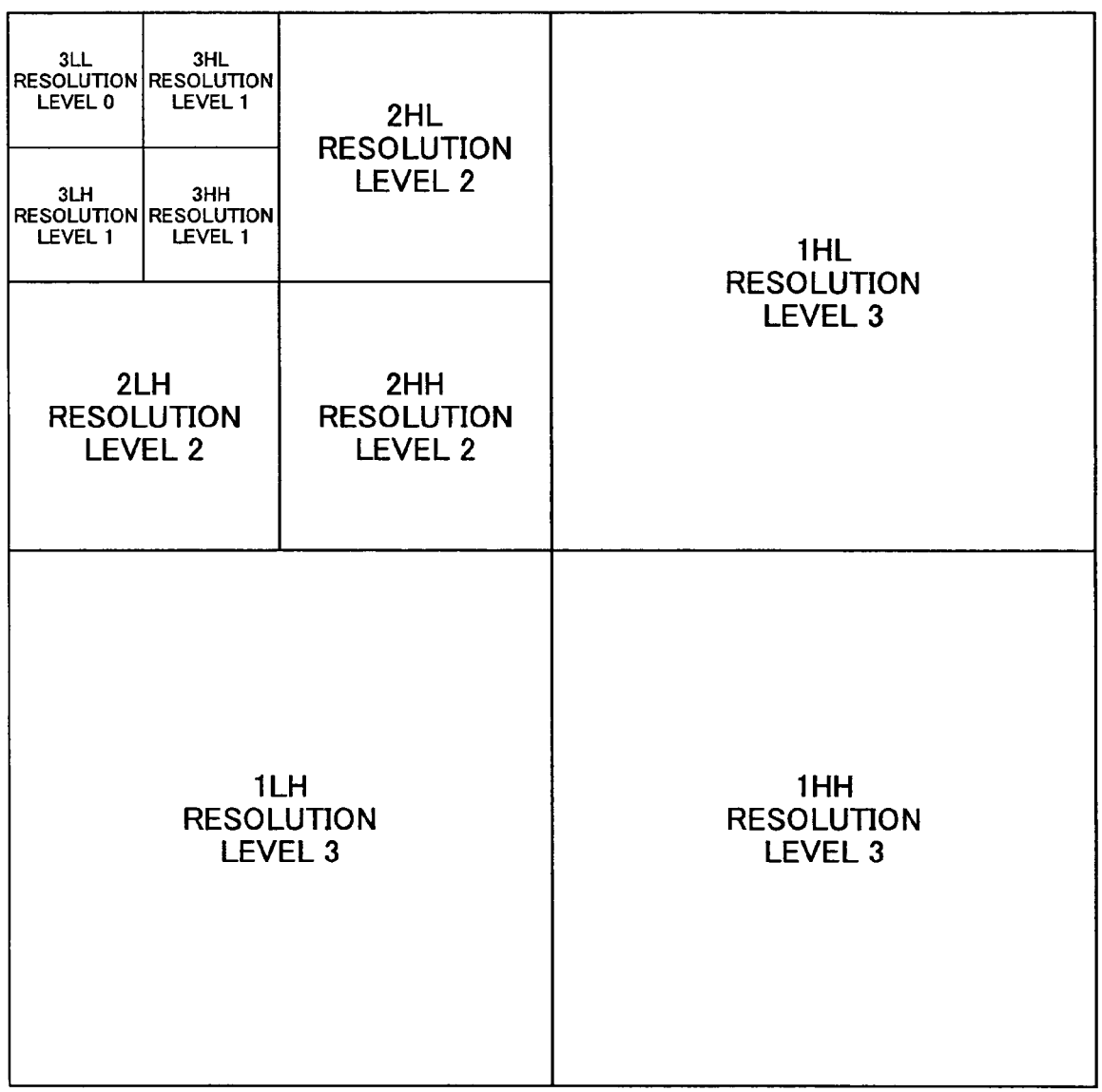
FIG. 9 is a schematic diagram showing a relationship between decomposition level and resolution level.

In FIGS. 7 and 8, the prefixes 1 and 2 of the coefficients indicate how many times wavelet transforms are performed to obtain the relevant coefficients, and these prefixes are called decomposition levels. FIG. 9 shows definitions of resolution levels, which are in an almost opposite relationship to the decomposition levels.

In the above-mentioned discussion, in a case where a wavelet transform is to be performed in only one dimension, only a process in the vertical direction or the horizontal direction may be performed.

On the other hand, in the inverse transform of a 5×3 wavelet transform, first, filtering is performed on the interleaved coefficient array as shown in FIG. 6 in the horizontal direction: inverse low-pass filtering is performed with respect to those coefficients whose X-coordinates are even numbers (x=2i), and then inverse high-pass filtering is performed with respect to those coefficients whose X-coordinates are odd numbers (x=2i+1) (this is performed on all ys).

In the set of inverse transform equations (5), the equation of step 1 represents an inverse low-pass filter, and the equation of step 2 represents a high-pass filter. Similar to the case of the forward transform, in an end portion of an image, adjacent coefficients may not exist with respect to a center coefficient. In such a case, a coefficient value is appropriately compensated according to a predetermined rule. However, a description thereof is omitted.

In the aforementioned manner, the coefficient array of FIG. 6 is transformed (inverse-transformed) to the coefficient array as shown in FIG. 5. Subsequently, in the vertical direction, inverse low-pass filtering is performed with respect to those coefficients whose Y-coordinates are even numbers (y=2i), and then inverse high-pass filtering is performed with respect to those coefficients whose Y-coordinates are odd numbers (y=2i+1) (this is performed on all X-coordinates). Thereby, a first inverse wavelet transform ends, and the image of FIG. 4 is recomposed. In a case where plural times of wavelet transforms are performed, the image of FIG. 4 may be assumed as a LL subband, and similar inverse transforms may be repeated by using the coefficients of other subbands such as a HL subband.

In JPEG 2000, when a 5×3 wavelet transform is used, quantization is not performed on coefficients composing subbands. On the other hand, when a 9×7 wavelet transform is used, linear (scalar) quantization may be performed on wavelet coefficients in each subband. In this case, a common quantization step number is used in the same subband.

Equation (8) represents a quantization equation, and equation (9) represents a quantization step number (Δb).

$$q_b(u,v) = \text{sign}(a_b(u,v)) * \text{floor}(|a_b(u,v)|/\Delta b) \quad (8)$$

$a_b(u,v)$: coefficient in a subband b
$q_b(u,v)$: coefficient in a subband b
$\Delta b$: quantization step in subband b $$\Delta b = 2^{Rb-\epsilon b} * \text{floor}(1 + \mu b/2^{11}) \quad (9)$$

Rb: dynamic range in subband b
$\epsilon b$: exponent of quantization in subband b
$\mu b$: mantissa of quantization in subband b There are two kinds of methods for determining the exponent $\epsilon b$ and the mantissa $\mu b$: a method of defining all subbands in each decomposition level; and a method of defining only the LL subband in the lowest decomposition level and the other subbands are defined by using a predetermined equation. The former is called expounded quantization or explicit quantization, and the latter is called derived quantization or implicit quantization. The pair of exponent and mantissa ($\epsilon b, \mu b$) in the implicit quantization is determined by the following equation (10).

$$(\epsilon b, \mu b) = (\epsilon_0 - N_L + n_b, \mu_0) \quad (10)$$

$n_b$: number of decomposition levels

A set of equations (11) represent inverse quantization equations.

$$Rq_b(u, v) = (q_b(u, v) + r * 2^{Mb-Nb(u,v)}) * \Delta b \text{ when } q_b(u, v) > 0 \quad (11)$$
$$= (q_b(u, v) - r * 2^{2Mb-Nb(u,v)}) * \Delta b \text{ when } q_b(u, v) < 0$$
$$= 0 \text{ when } q_b(u, v) = 0$$

In the case where a 5×3 wavelet transform is used, the quantization step number (Δb) is always 1, which indicates that quantization is not performed as mentioned above.

In JPEG 2000, quantization and entropy coding are in a close relationship: coding may be performed after quantization, or codes may be discarded after coding (or coding may be performed only on necessary bit-plane portions). In the case where quantization is performed, the above-mentioned linear quantization is performed on wavelet coefficients, and bit-planes composed of the quantized coefficients are entropy coded. On the other hand, in the case where the linear quantization is not performed, codes of unnecessary bit-planes are discarded. When using a 5×3 wavelet transform in which necessary bit-planes are coded (as mentioned above, this is also called truncation in this specification), since the linear quantization cannot be applied, only truncation is performed.

A description is given below of embodiments of the present invention.

Figure 10:
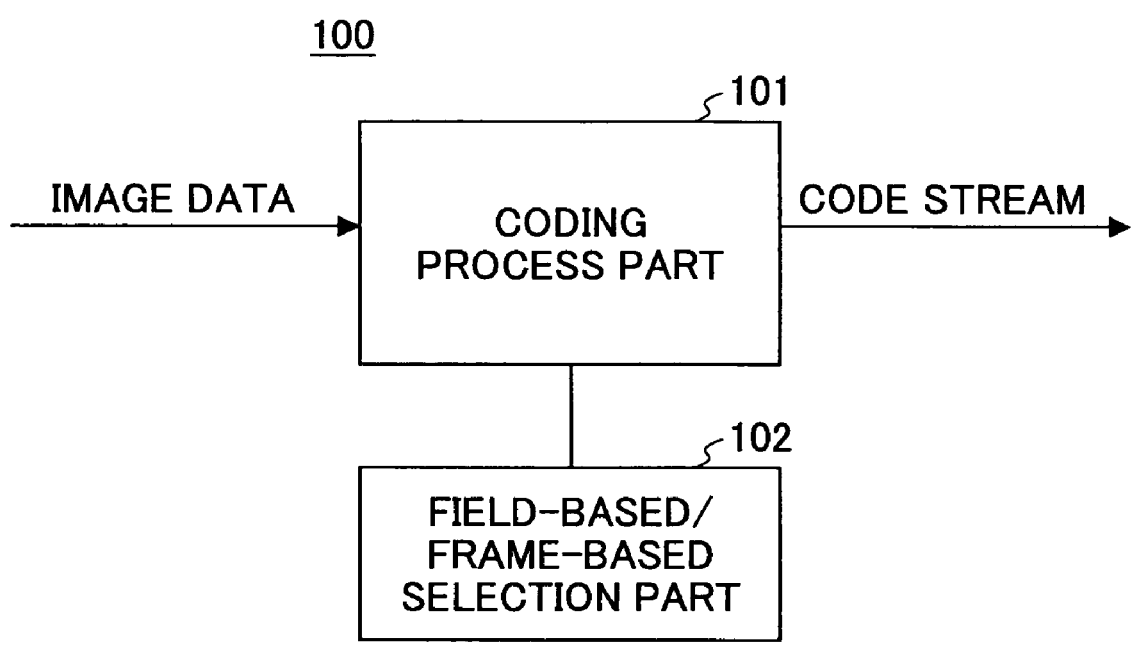
FIG. 10 is a block diagram of a coding apparatus according to one embodiment of the present invention.

FIG. 10 is a functional block diagram of a coding apparatus 100 of one embodiment of the present invention. The coding apparatus 100 includes: a coding process unit 101 that performs a coding process; and a field-based/frame-based selection unit 102 that selects either a field-based coding process or a frame-based coding process, which is to be performed in the coding process unit 101. The above-mentioned JPEG 2000 algorithm is used in the coding process unit 101.

Image data to be input to the coding apparatus 100 may be image data of each field (interlaced image) or a frame image synthesized from interlaced images of an odd-numbered field and an even-numbered field. In the case where a frame image is input, when performing the field-based coding process, the image of each field is extracted from the frame image. In the case where a field image is input, when performing the frame-based coding process, synthesizing of frame images is performed.

The field-based/frame-based selection unit 102 selects one of the field-based coding process and the frame-based coding process. The selection may be based on the degree of quantization, the degree of truncation, the degrees of quantization and truncation, or a compression rate. In addition, the degree of quantization and the degree of truncation may be high or may be a decomposition level 1 of a wavelet transform. It should be noted that a coding method of the present invention includes a process step corresponding to the coding process unit 101 and a process step corresponding to the field-based/frame-based selection unit 102. Accordingly, a description related to the coding apparatus 100 of the present invention also serves as a description of the coding method of the present invention.

The coding process unit 101 and the field-based/frame-based selection unit 102 of the coding apparatus 100 (the corresponding process steps of the coding method of the present invention) may be realized by a program (an application program or a device driver such as a printer driver) by using a computer such as a personal computer and a microcomputer. An embodiment of the present invention also includes such a program and various information recording (storage) media recording the program thereon, such as a computer-readable magnetic disk, optical disk, magnetic optical disk, and semiconductor memory device.

Figure 11:
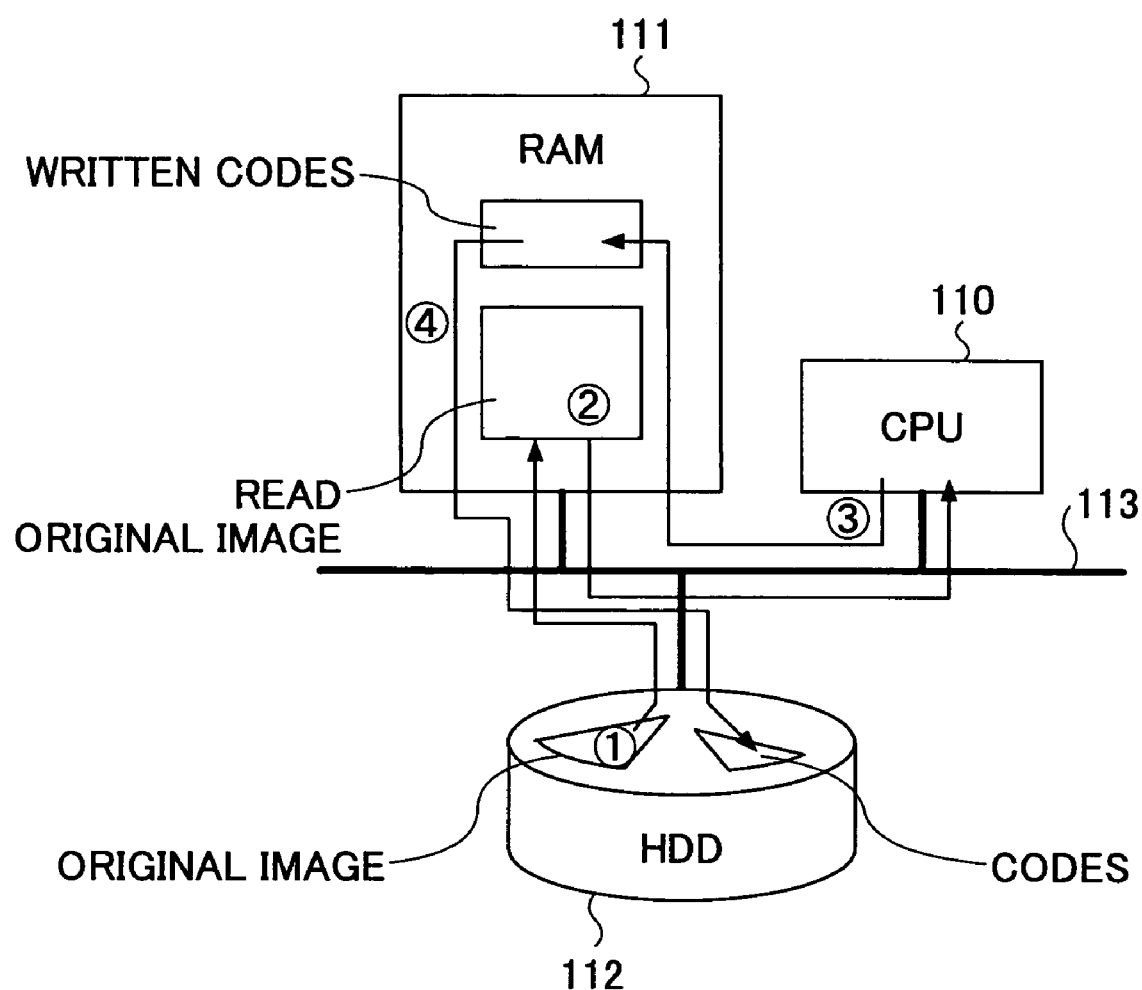
FIG. 11 is a schematic diagram for illustrating one embodiment that performs the present invention by using a computer.

Referring to FIG. 11, a brief description is given of an embodiment in which the present invention is performed by using a computer. FIG. 11 shows a central processing unit (CPU) 110, a memory 111 for temporarily storing, for example, data and program, a hard disk device 112 serving as a secondary storage, and a system bus 113. It is assumed that a moving image to be coded is stored in the hard disk device 112 in the form of, for example, frame images. However, such a moving image may be stored in the form of field images.

The outline of a process flow is as follows. First, upon an instruction from the CPU 110, one frame of a moving image is read into the memory 111 from the hard disk device 112 (process 1). The CPU 110 reads the frame in the memory 111 (process 2), selects either the field-based coding process or the frame-based coding process, and performs the selected coding process. The CPU 110 writes coded data into another area of the memory 110 (process 3). When the process for one frame ends, upon an instruction from the CPU 110, the coded data are recorded in the hard disk device 112 (process 4). The above-mentioned processes 1 through 4 are repeated for the number of the frames of the moving image.

A description is given below of several embodiments of the present invention. It should be noted that, in each of the embodiments, the processes of DC level shifting and component transform are omitted for simplicity.

In one embodiment, a 9×7 wavelet transform is used and the linear quantization is performed. The quantization step number of the linear quantization (the denominator of division at the time of the linear quantization) is normally determined as follows.

quantization step number=constant×(number determined by normalization for maximizing PSNR) (12)

When quantized coefficients are subjected to an inverse wavelet transform at the time of decoding and returned to RGB values, the influence of a quantization error in each coefficient given to a final RGB value is different in each subband (each frequency band), and the ratio is determined by the constant (so-called subband gain) at the time of the inverse wavelet transform (inverse frequency transform). In order to improve the PSNR, it is necessary to make the influence uniform among subbands. In order to make the influence uniform, quantization canceling the above-mentioned gain is performed for each subband. The details are described in "Performance evaluation of subband coding and optimization of its filter coefficients", J. Katto and Y. Yasuda, Journal of Visual Communication and Image Representation, vol. 2, December 1991, pp. 303-313. Generally, in order to minimize the root mean square of an error in an inverse-transformed signal (composed of plural signal values) at a certain compression rate (in order to maximize the PSNR), each subband is linearly quantized by the reciprocal of the square root of the subband gain (the value obtained by multiplying the above-mentioned reciprocal by a constant).

FIG. 12 shows the reciprocals of the root squares of subband gains in the case where the number of decomposition levels=2.

In the case where an original image is composed of plural components, the quantization step number for each component is calculated by adding the gain of the above-mentioned inverse ICT (inverse irreversible component transform) to a basic quantization step number. The gain of an inverse ICT is a sum of squares of an error in a RGB value caused by an error in each component, and is uniquely determined by the above-mentioned equation of the inverse ICT. Square roots of the gain of the inverse ICT and the reciprocals thereof are as shown in FIG. 13.

Thus, by multiplying the equation (12) by the reciprocal of the square root of an inverse ICT gain, "constant×(number determined by normalization for maximizing PSNR under the usage of the ICT)" (FIG. 14) is determined. Hereinafter, the determined number is referred to as the basic quantization step number (size). Here, it is assumed that: constant=square root of subband gain of Y component of inverse ICT.

In this embodiment, by using a user-specified constant similar to "scaling factor" in the conventional JPEG, quantization of coefficients of a subband is performed by using a quantization step number determined by the following equation (13).

quantization step number=user-specified constant (scaling factor k)×basic quantization step number (FIG. 14) (13)

Thereby, it is possible to perform linear quantization reflecting the degree of quantization intended by a user.

In this embodiment, one of the field-based coding and the frame-based coding is selected by comparing the user-specified constant (scaling factor k), which determines the degree of quantization, with a predetermined value. More specifically, the field-based coding is selected when k>64, while the frame-based coding is selected when k≦64.

Figure 15:
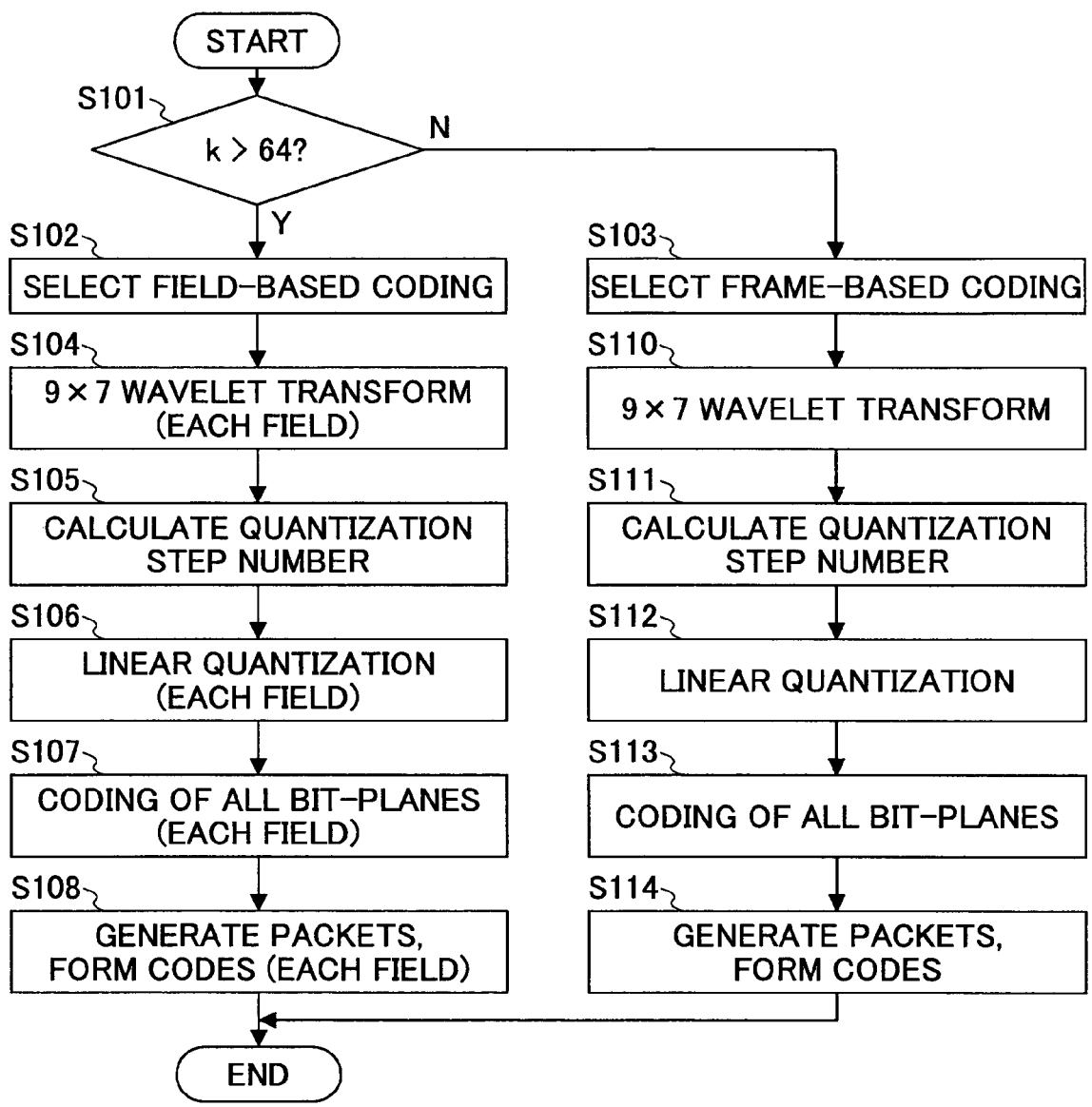
FIG. 15 is a flowchart for illustrating processes in Embodiment 1.

FIG. 15 is a flowchart for illustrating processes in this embodiment.

First, in step S101, it is determined in the field-based/frame-based selection unit 102 whether the user-specified scaling factor k is larger than the predetermined value 64. When k>64 (YES in step S101), the field-based coding process is selected in step S102. When k≦64 (NO in step S101), the frame-based coding process is selected in step S103. Subsequently, the selected coding process is performed by the coding process unit 101.

A description is given below of the case where the frame-based coding process is selected.

In step S110, a 9×7 wavelet transform is performed on a frame image. In step S111, the quantization step number is calculated by the equation (13) with respect to each subband of each component. In step S112, linear quantization using the calculated quantization step number is performed on wavelet coefficients for each subband of each component. In step S113, all bit-planes of the quantized coefficients are entropy-coded. In step S114, processes of generating packets and forming codes are performed, thereby generating a code stream with respect to the relevant frame.

A description is given below of the case where the field-based coding process is selected.

Figure 17A:
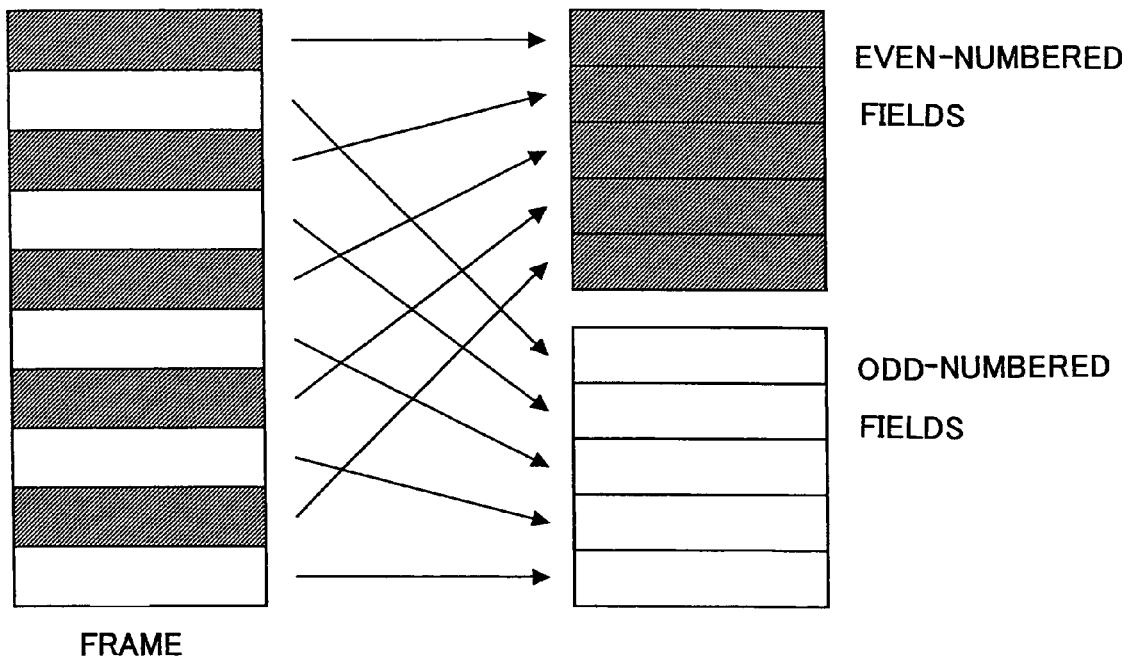
FIGS. 17A and 17B are schematic diagrams for illustrating field division of a frame image.
Figure 17B:
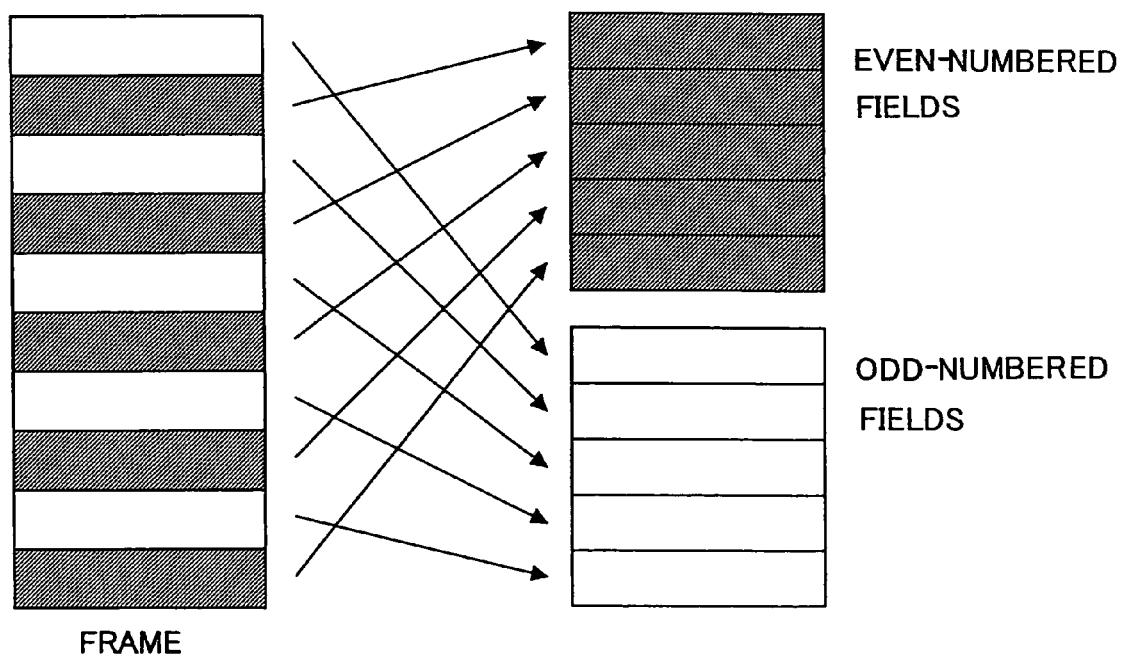

In this case, as shown in FIGS. 17A and 17B, a frame image is decomposed into even-numbered fields and odd-numbered fields by selecting every other line of data. Depending on the time relationship among the odd-numbered fields, field decomposition is performed as shown in FIG. 17A or FIG. 17B.

Then, the wavelet transform and the subsequent processes are performed on each field image, and a code stream is generated for each field. The processes performed on each field image are similar to those in the case of the frame-based coding process. That is, in step S104, a 9×7 wavelet transform is performed on each field image. In step S105, the quantization step number is calculated by the equation (13) for each subband of each component. In step S106, linear quantization of wavelet coefficients is performed for each subband of each component. In step S107, all bit-planes of the quantized coefficients are entropy-coded for each subband of each component. In step S108, the processes of generating packets and forming codes are performed, thereby generating a code stream for each field.

Figure 16:
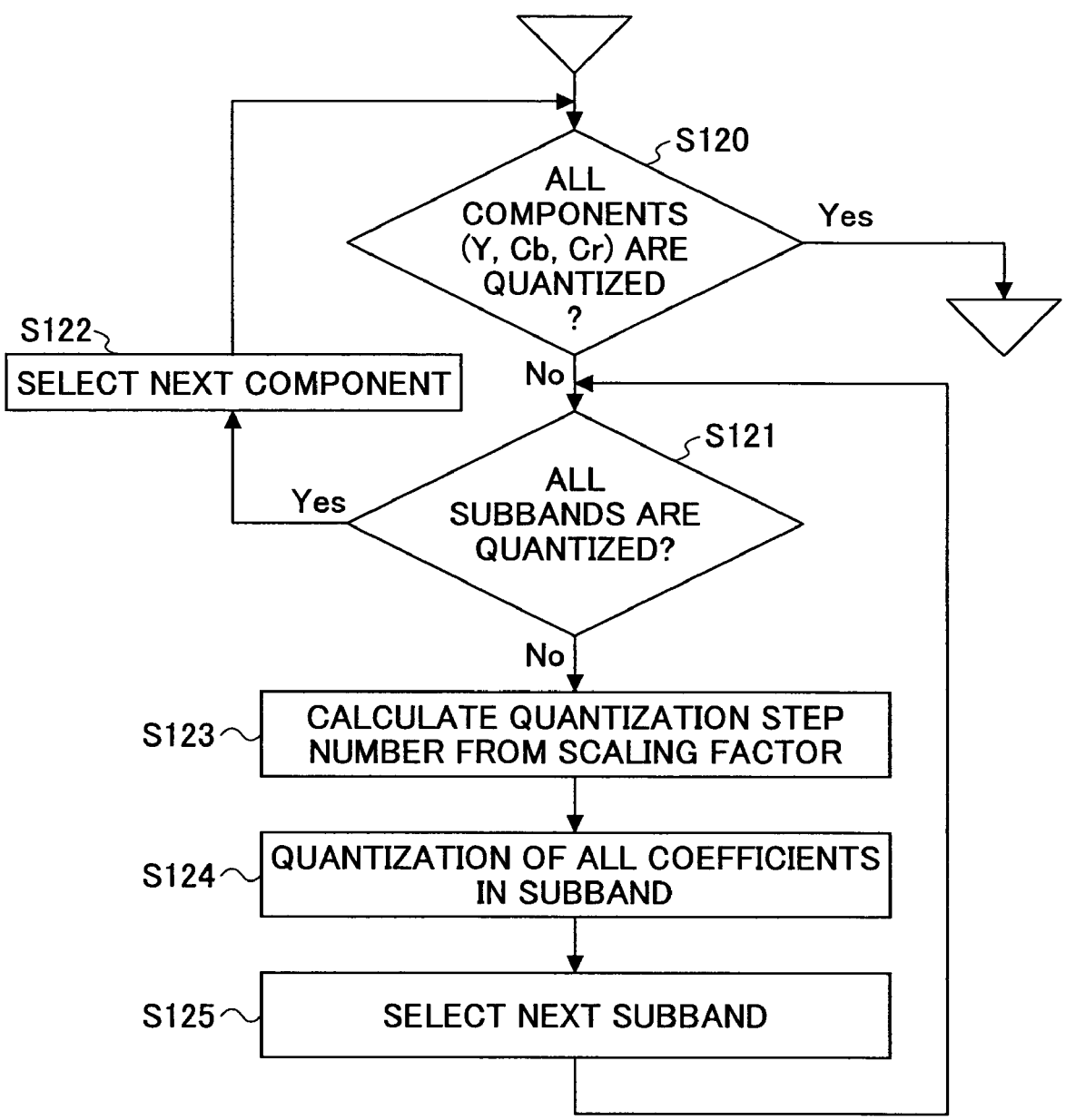
FIG. 16 is a flowchart for illustrating calculation of a quantization step number and linear quantization in detail.

FIG. 16 is a flowchart for illustrating one embodiment of a more specific process flow of the calculation of quantization step number and the linear quantization (steps S111 and S112 or steps S105 and S106 of FIG. 15). As shown in the flowchart of FIG. 16, a component is selected (steps S120, S121 and S122), and quantization is performed by calculating the quantization step number while sequentially selecting subbands of the selected component (steps S121, S123, S124 and S125). When all subbands of all components are processes (YES in step S120), the process proceeds to the processes of generating packets and forming codes (step S115 or S108 of FIG. 15).

In another embodiment, a 5×3 wavelet transform is used, linear quantization of wavelet coefficients is not performed, and truncation is performed on coefficients.

As mentioned above, the basic process flow in the case of using a 5×3 wavelet transform is: wavelet transform of an original signal to subbands→code only necessary higher bit-planes (or higher sub-bit-planes) for each subband.

This embodiment also uses a user-specified constant similar to the "scaling factor" in the conventional JPEG. By using the user-specified constant, "unnecessary lower bit-planes" other than the "necessary higher bit-planes", that is, the number of bit-planes to be truncated, is calculated in the following manner. It should be noted that the reciprocals of the square roots of subband gains in the case of a 5×3 wavelet transform have the values shown in FIG. 18. In addition, the RCT is used for color conversion, and the square roots of gains of the inverse RCT have the values shown in FIG. 19. Thus, by multiplying the reciprocal of the square root of such a subband gain by the reciprocal of the square root of a gain of the inverse RCT and further by the user-specified constant, "constant×(number determined by normalization for maximizing PSNR under usage of RCT" (FIG. 20) is determined. In this embodiment, it is assumed that: constant=square root of subband gain of Y component of inverse RCT.

The values obtained by multiplying the values shown in FIG. 20 by the scaling factor correspond to the values of the equation (13) in the case where a 9×7 wavelet transform is used. However, since it is difficult or impossible to apply linear quantization in the case of using a 5×3 wavelet transform, in this embodiment, the above-mentioned values are transformed to the numbers of bit-planes to be truncated (truncation number, or number of truncations).

In terms of quantization error, truncation of n bit-planes is equivalent to linear quantization of wavelet coefficients by $2^n$. Hence, the following equation (14) holds.

$$\text{truncation number} = \log_2(\text{value of FIG. 20} \times \text{scaling factor } k) \quad (14)$$

For example, when k=32, the values of FIG. 20 are converted to the truncation numbers of FIG. 21. However, since the numbers of bit-planes are integers, the right-hand side is rounded off by, for example, counting fractions over ½ as one and discarding the rest.

Also in this embodiment, the field-based coding or the frame-based coding is selected by comparing the user-specified constant (scaling factor k), which determines the degree of truncation, with a predetermined value. In this embodiment, the predetermined value is 64: the field-based coding is selected when k>64, and the frame-based coding is selected when k≦64.

Figure 22:
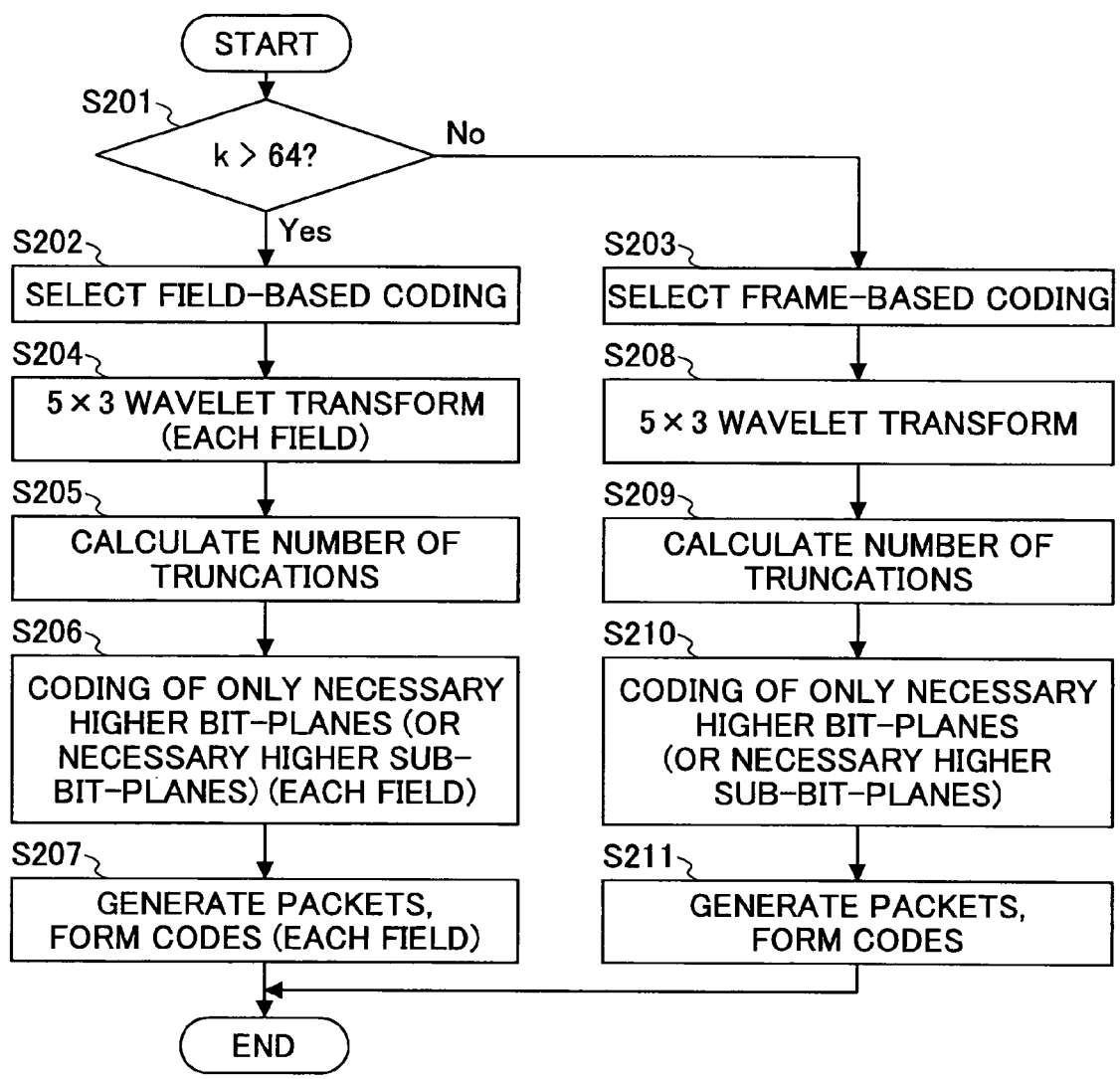
FIG. 22 is a flowchart for illustrating processes in Embodiment 2.

FIG. 22 is a flowchart for illustrating a process in this embodiment.

First, in step S201, in the field-based/frame-based selection unit 102, the user-specified scaling factor k is compared with the predetermined value (64). When k>64 (YES in step S201), the field-based coding process is selected in step S202. When k≦64 (NO in step S201), the frame-based coding process is selected in step S203. Then, the selected coding process is performed by the coding process unit 101.

A description is given below of the case where the frame-based coding process is selected.

In step S208, a 5×3 wavelet transform is performed on a frame image. In step S209, a truncation number is calculated by the equation (14) for each subband of each component. In step S210, according to the truncation number, only necessary higher bit-planes (or necessary higher sub-bit-planes) of wavelet coefficients are entropy-coded for each subband of each component. That is, the coefficients are truncated for the truncation number calculated in step S209. In step S211, the processes of generating packets and forming codes are performed, thereby generating the code stream with respect to the relevant frame.

A description is given below of processes in the case where the field-based coding process is selected.

In this case, a frame image is decomposed into even-numbered fields and odd-numbered fields as mentioned above (see FIGS. 17A and 17B). Each field image is subjected to the wavelet transform and the subsequent processes, thereby generating the code stream for each field.

The processes performed on each field image are similar to those in the case of the frame-based coding process. That is, in step S204, a 5×3 wavelet transform is performed on each field image. In step S205, the truncation number is calculated by the equation (14) for each subband of each component. In step S206, according to the truncation number, only necessary higher bit-planes (or necessary higher sub-bit-planes) are entropy-coded for each subband of each component. In step S207, the process of generating packets and forming codes are performed, thereby generating the code stream with respect to each field of the relevant frame.

Figure 23:
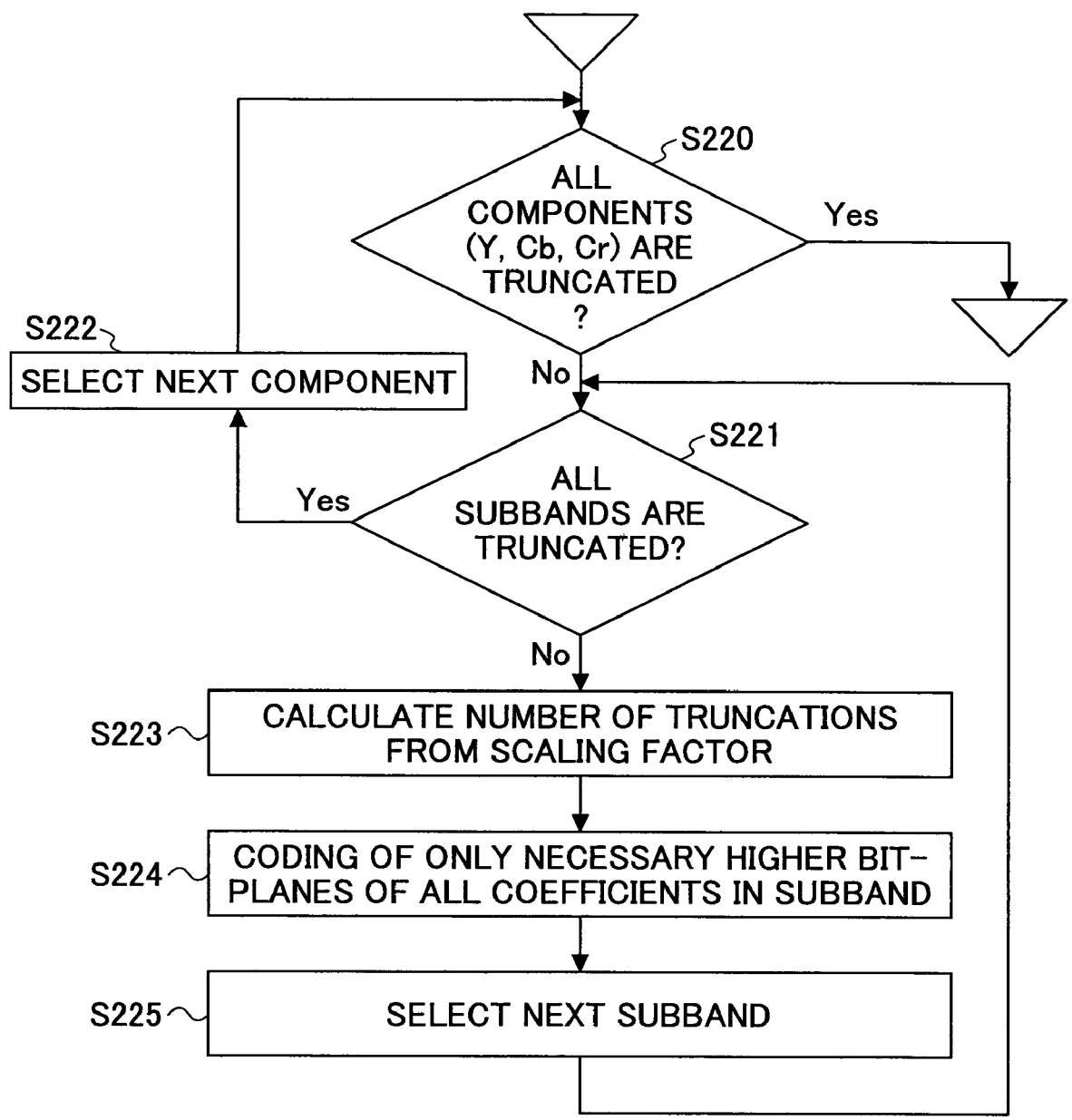
FIG. 23 is a flowchart for illustrating calculation of truncation number and entropy coding in detail.

FIG. 23 is a flowchart for illustrating one embodiment of a more specific process flow of the calculation of truncation number and the entropy coding (steps S209 and S210 or steps S205 and S206). As shown in the flowchart of FIG. 23, a component is selected (step S220, S221 and S222), the truncation number is calculated while sequentially selecting sub-bands of the selected component, and only the necessary higher bit-planes (or necessary higher sub-bit-planes) are entropy-coded (steps S221, S223, S224 and S225). When all subbands of all components are processed (YES in step S220), the process proceeds to the processes of generating packets and forming codes (step S211 or S207).

In another embodiment, a 9×7 wavelet transform is used and both linear quantization and truncation are performed. Whether to select the field-based coding or the frame-based coding is determined based on "the degrees of quantization and truncation". In this embodiment, truncation is performed on coefficients.

In this embodiment, the basic quantization step numbers of FIG. 14 are used as the quantization step numbers of linear quantization. The number of bit-planes to be truncated (truncation number, or number of truncations) is calculated by the following equation (15).

$$\begin{aligned}\text{truncation number} = \\ \log_2(\text{basic quantization step number of FIG. 14} \times \\ \text{square root of subband gain} \times \text{square root} \\ \text{of inverse } ICT \text{ gain} \times \text{scaling factor } k)\end{aligned} \quad (15)$$

As can be appreciated, "the degrees of quantization and truncation" are determined by the user-specified scaling factor k. Thus, also in this embodiment, the scaling factor k is compared with a predetermined value (here, 64): the field-based coding is selected when k>64, and the frame-based coding is selected when k≦64.

It should be noted that the quantization step number of linear quantization may be varied in accordance with the scaling factor k. Further, the determination method of the truncation number is not limited to the above-mentioned method.

Figure 24:
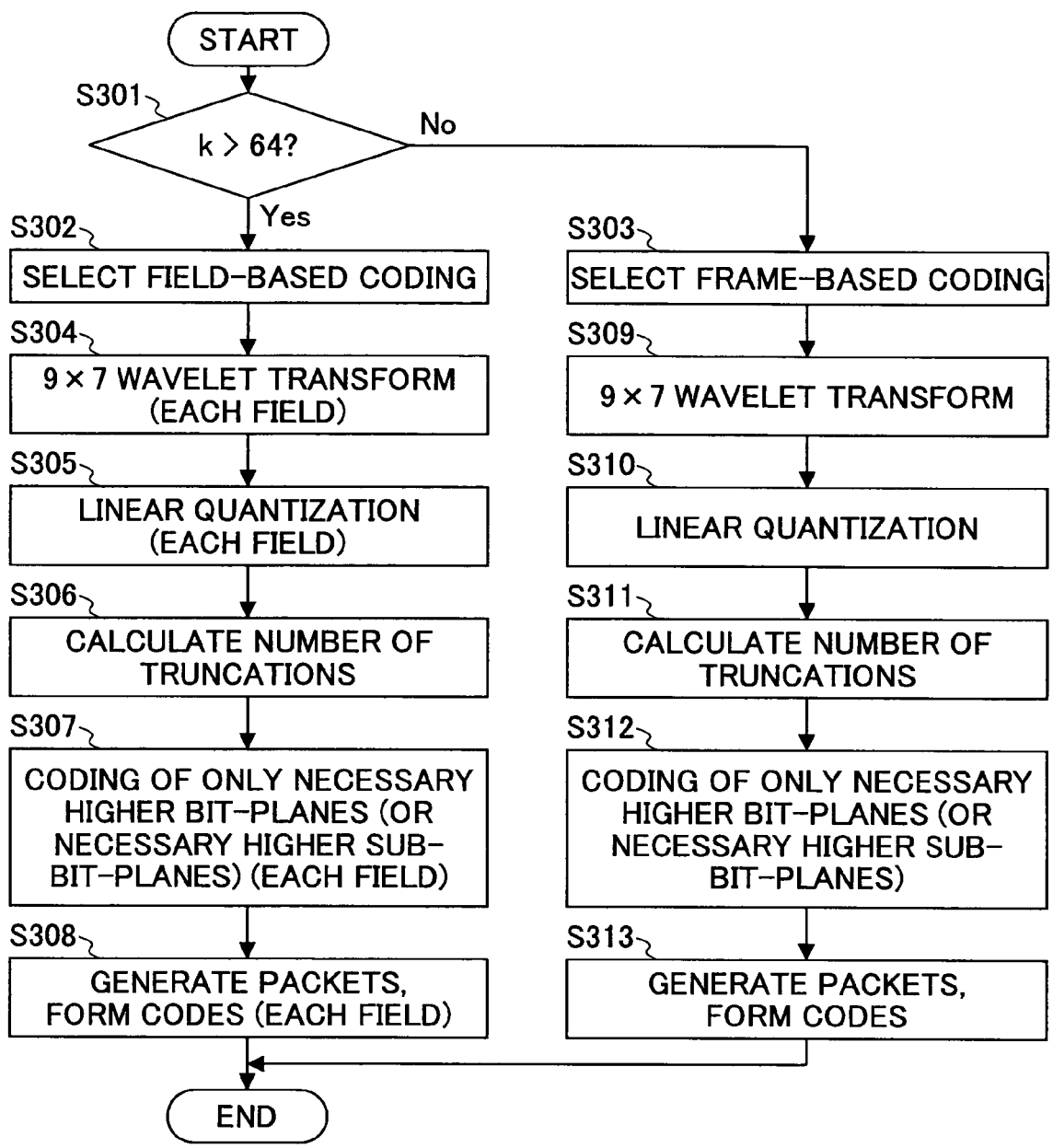
FIG. 24 is a flowchart for illustrating processes in Embodiment 3.

FIG. 24 is a flowchart for illustrating processes in this embodiment.

In step S301, in the field-based/frame-based selection unit 102, the user-specified scaling factor k is compared with the predetermined value (64). When K>64 (YES in step S301), the field-based coding process is selected in step S302. When k≦64 (NO in step S301), the frame-based coding process is selected in step S303. Subsequently, the selected coding process is performed by the coding process unit 101.

In the case where the frame-based coding process is selected, first, in step S309, a 9×7 wavelet transform is performed on a frame image. In step S310, linear quantization using the basic quantization step number (see FIG. 14) is performed on each subband of each component. In step S311, the truncation number is calculated by the equation (15) for each subband of each component. In step S312, according to the truncation number, only necessary higher bit-planes (or necessary higher sub-bit-planes) of coefficients are entropy-coded for each subband of each component. In step S313, the processes of generating packets and forming codes are performed, thereby generating the code stream for the relevant frame.

In the case where the field-based coding process is selected, in step S304, a frame image is decomposed into even-numbered fields and odd-numbered fields as mentioned above (see FIGS. 17A and 17B), and each field image is subjected to a 9×7 wavelet transform. The subsequent processes are also separately performed on the even-numbered fields and the odd-numbered fields. That is, in step S305, linear quantization using the basic quantization step number (see FIG. 14) is performed for each subband of each component. In step S306, the truncation number is calculated by the equation (15) for each subband of each component. In step S307, according to the truncation number, only necessary higher bit-planes (or necessary higher sub-bit-planes) are entropy-coded for each subband of each component. In step S308, the processes of generating packets and forming codes are performed, thereby generating the code stream of each field of the relevant frame.

It should be noted that the process flow of linear quantization (step S305 or S310) is similar to that shown in FIG. 16 except for the use of the basic quantization step number. In addition, the process flow of the calculation of the truncation number and the entropy coding (steps S306 and S307 or steps S311 and S312) is similar to that shown in FIG. 23 except for the difference in the calculation equation of the truncation number.

In yet another embodiment, a user specifies a compression rate, and truncation is controlled so that the compression rate is achieved. The truncation is performed on codes. A 5×3 wavelet transform is used and linear quantization is not performed. In addition, when the compression rate specified by a user is larger than a predetermined value (here, 30), the field-based coding is selected, and when not, the frame-based coding is selected.

Figure 25:
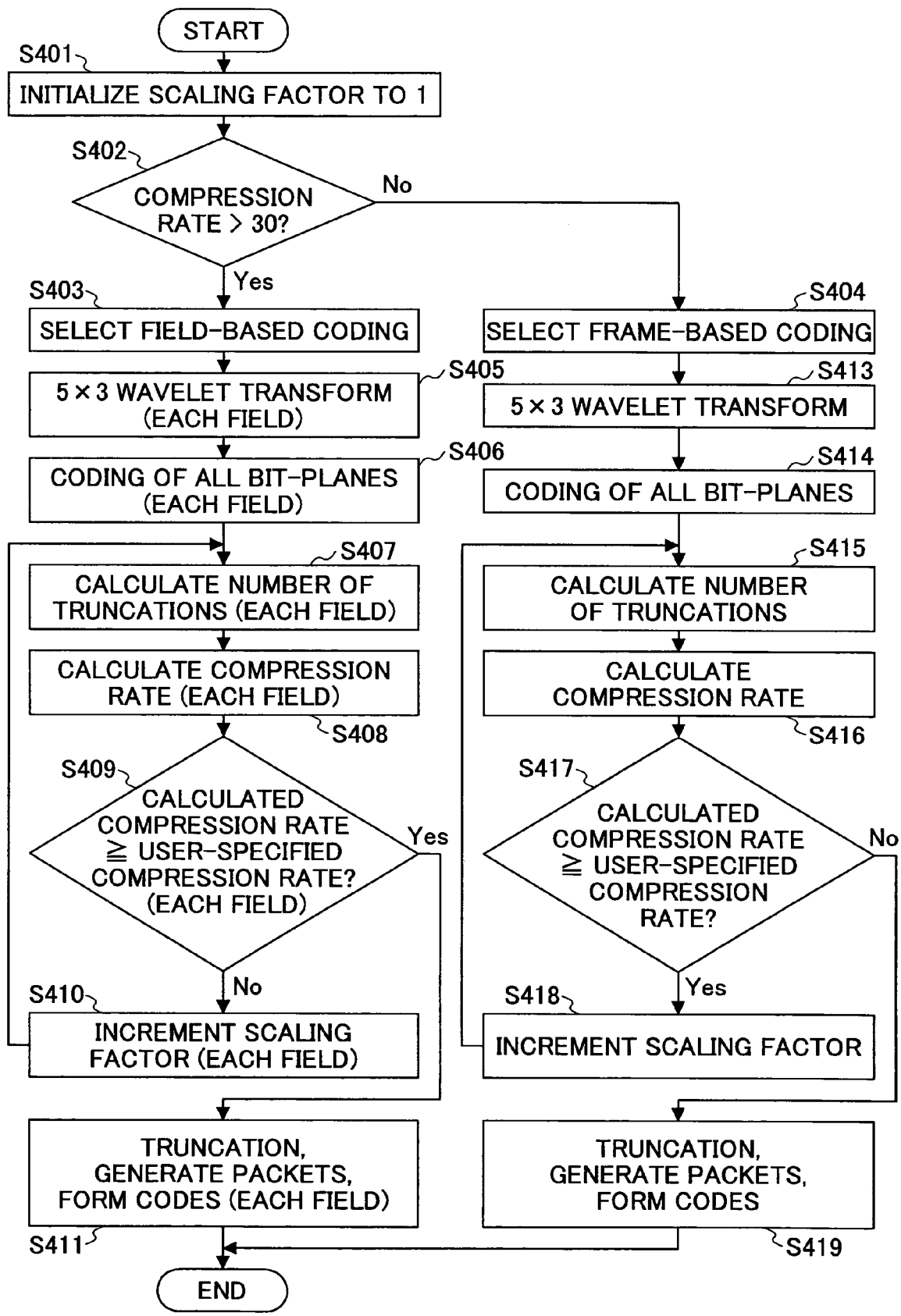
FIG. 25 is a flowchart for illustrating processes in Embodiment 4.

FIG. 25 is a flowchart for illustrating processes in this embodiment.

In step S401, the scaling factor k is set to 1 as the initial value. In step S402, in the field-based/frame-based selection unit 102, the user-specified compression rate is compared with the predetermined value (30). When the compression rate>30 (YES in step S402), the field-based coding is selected in step S403. When the compression rate≦30 (NO in step S402), the frame-based coding is selected in step S404.

When the field-based coding is selected, a frame image is decomposed into even-numbered fields and odd-numbered fields in the coding process unit 101 (see FIGS. 17A and 17B), and each field image is subjected to a 5×3 wavelet transform in step S405. The subsequent processes are also separately performed on the odd-numbered fields and the even-numbered fields. Wavelet coefficients of each component are entropy-coded for each subband with respect to all bit-planes. On this occasion, the amount of codes of each bit-plane of each subband is stored in step S406. In step S407, the truncation number of each subband is calculated by the equation (14) by using the scaling factor k. In step S408, the amount of codes in the case of performing truncation of codes for the truncation number is calculated based on the stored amount of codes and the obtained truncation number, thereby calculating the compression rate after the truncation. In step S409, the calculated compression rate is compared with he user-specified compression rate. When the calculated compression rate is smaller than the user-specified compression rate (NO in step S409), the scaling factor k is incremented in step S410, and the process returns to step S407. Determination of the compression rate is repeated while sequentially incrementing the scaling factor k in the aforementioned manner. When the calculated compression rate becomes equal to or larger than the user-specified compression rate (YES in step S409), in step S411, packets are generated and codes are formed from the codes after truncation by the truncation number then. In the aforementioned manner, the code stream is generated for each field at the user-specified compression rate.

When the frame-based coding is selected, the frame-based coding process is performed by the coding process unit 101. Since process steps S413 through S419 are similar to steps S405 through S411 except for being frame-based, a description thereof is omitted.

In still yet another embodiment, a 9×7 wavelet transform is used and linear quantization is performed. The quantization step number of each subband is specified by the user. Whether to select the field-based coding or the frame-based coding is determined by using the quantization step number (degree of quantization) for higher subbands specified by the user. In this embodiment, the field-based coding is selected in the case where any of the quantization step numbers of brightness of a subband (1LH, 1HL or 1HH) of the decomposition level 1, which is the highest level, exceeds a threshold value. In other cases, the frame-based coding is selected. In this embodiment, 128 is used as the threshold value.

Figure 26:
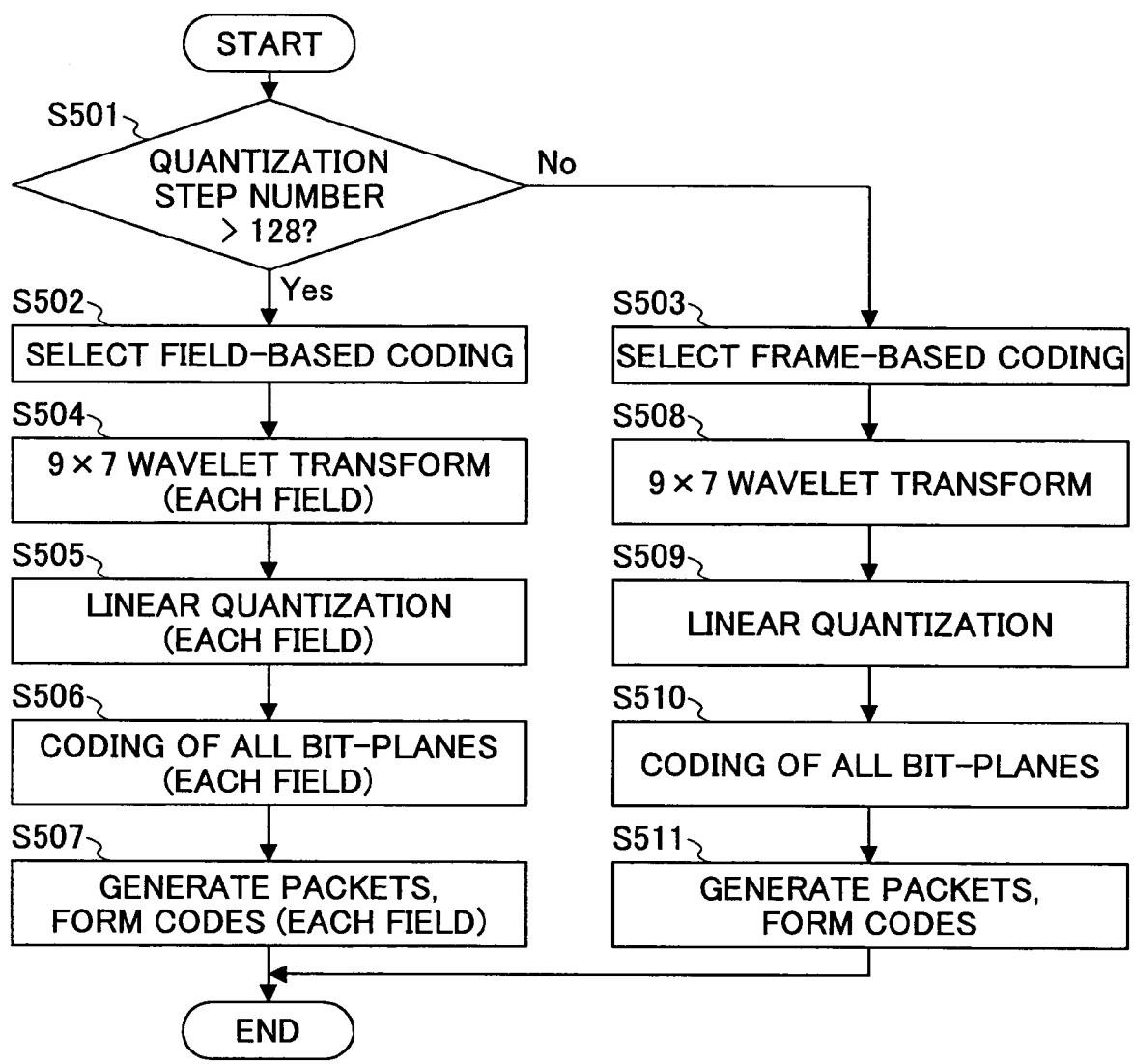
FIG. 26 is a flowchart for illustrating processes in Embodiment 5.

FIG. 26 is a flowchart for illustrating processes in this embodiment.

In step S501, in the field-based/frame-based selection unit 102, comparison is made between the threshold value (128) and the maximum quantization step number among the quantization step numbers of brightness of the decomposition level 1 specified by the user. When the maximum quantization number is larger than 128 (YES in step S501), the field-based coding is selected in step S502, and when not (NO in step S501), the frame-based coding is selected in step S503.

When the field-based coding is selected, a frame image is decomposed into even-numbered fields and odd-numbered fields in the coding process unit 101 (see FIGS. 17A and 17B), and each field is subjected to the following processes. In step 5504, a 9×7 wavelet transform is performed on each field. In step S505, linear quantization using the user-specified quantization step number is performed on each subband of each component. In step S506, quantized coefficients are entropy-coded with respect to all bit-planes for each subband of each component. In step S507, the processes of packet generation and code forming are performed. In the aforementioned manner, the code stream for each field is generated.

When the frame-based coding is selected, in the coding process unit 101, processes (steps S508 through S511) similar to those in steps S504 through S507 are performed on a frame image. Thereby, the code stream for the relevant frame is generated.

In another embodiment, a 9×7 wavelet transform is used, and linear quantization and truncation for coefficients are performed. The quantization step number and the truncation number for each subband are specified by the user.

When selecting the field-based coding or the frame-based coding, the quantization step number and the truncation number (the degrees of quantization and truncation) of user-specified subbands in a higher range are used. In this embodiment, the quantization step number and the truncation number of brightness of a subband (1LH, 1HL or 1HH) of the decomposition level 1, which is the highest level, are used.

Specifically, selection between the field-based coding and the frame-based coding is made as follows. Based on the quantization step number and the truncation number (TN) of brightness of a subband (1LH, 1HL or 1HH) of the decomposition level 1, $$\text{quantization step number} \times 2^{TN} \quad (16)$$

is calculated. In the case where any of obtained values exceeds a threshold value, the field-based coding is selected. In other cases, the frame-based coding is selected. In this embodiment, 128 is used as the threshold value.

Figure 27:
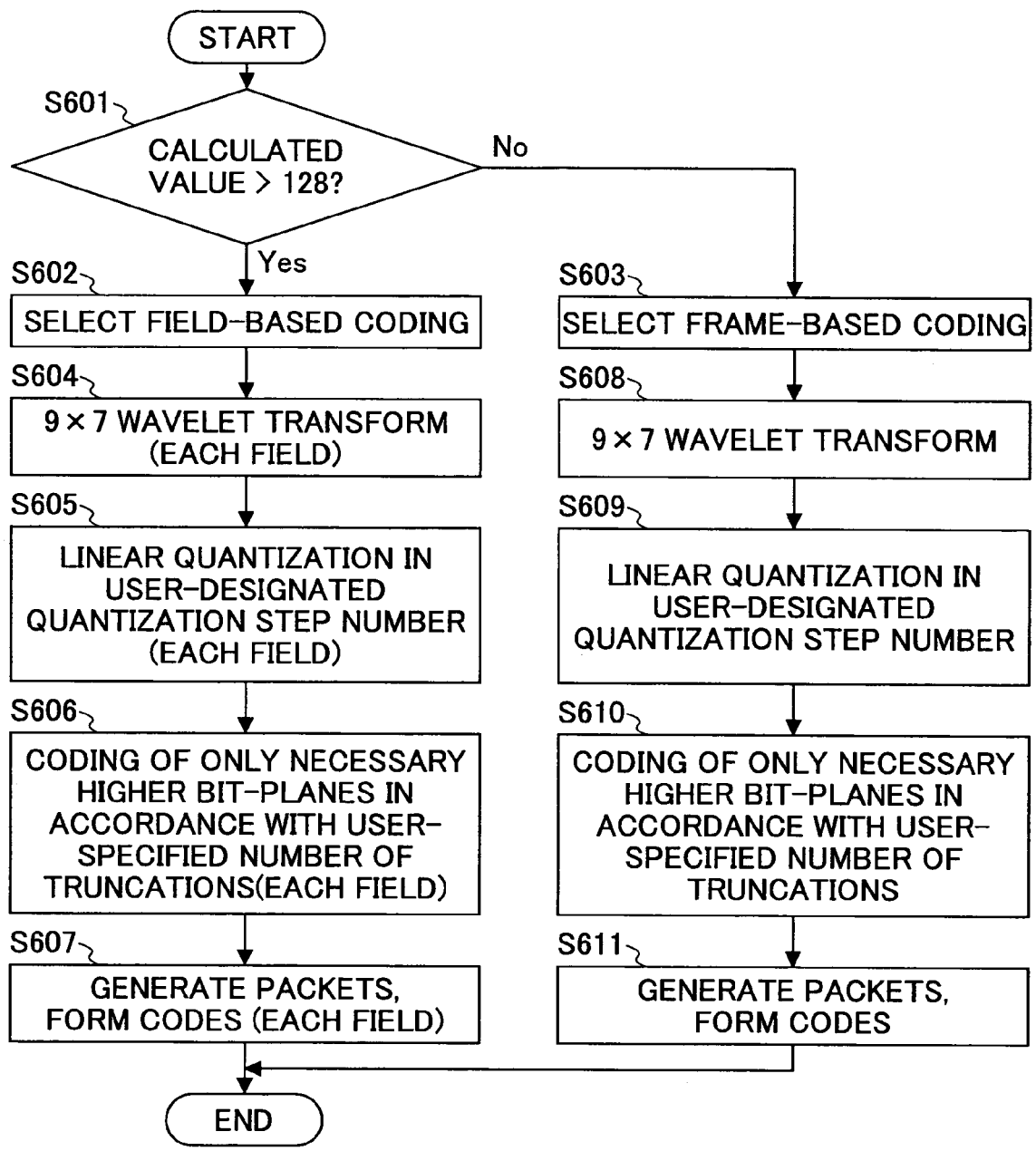
FIG. 27 is a flowchart for illustrating processes in Embodiment 6.

FIG. 27 is a flowchart for illustrating processes in this embodiment.

In step S601, in the field-based/frame-based selection unit 102, the value calculated by the equation (16) is compared with the threshold value (128). In a case where any of the calculated values is larger than the threshold value, he field-based coding is selected in step S602. In the other cases, the frame-based coding is selected in step S603.

When the field-based coding is selected, a frame image is decomposed into even-numbered fields and odd-numbered fields in the coding process unit 101 (see FIGS. 17A and 17B), and each field is subjected to the following processes. In step S604, a 9×7 wavelet transform is performed on each field. In step S605, linear quantization using the user-specified quantization step number is performed for each subband of each component. In step S606, according to the user-specified truncation number, only the necessary higher bit-planes of the quantized coefficients are entropy-coded for each subband of each component. In step S607, the processes of packet generation and code forming are performed. In the aforementioned manner, the code stream for each field is generated.

When the frame-based coding is selected, in the coding process part 101, a frame image is subjected to processes (steps S608 through S611) similar to those in steps S604 through S607. Thereby, the code stream for the relevant frame is generated.

FIG. 28 shows general structures of codes of JPEG 2000 in the case where the number of decomposition levels is 2. In FIG. 28, "bit-plane of LSB (vicinity)" indicates the code of the least significant bit-plane that remains without being truncated.

The present invention is not limited to the specifically disclosed embodiments, and variations and modifications may be made without departing from the scope of the present invention.

The present application is based on Japanese Priority Application No. 2003-314338 filed on Sep. 5, 2003, the entire contents of which are hereby incorporated by reference.

What is claimed is:

1. A coding apparatus comprising:
   a coding process unit to perform one of a field-based coding process and a frame-based coding process with respect to an interlaced image; and
   a selection unit to determine which of the field-based coding process and the frame-based coding process is to be performed based on a magnitude relationship between a scaling factor designated by a user and a predetermined value;
   wherein said frame-based coding process is to perform a 9×7 wavelet transform on each frame image, perform a quantization process using a quantization step number calculated based on the scaling factor designated by the user and a basic quantization step number with respect to each subband of each component, and perform an entropy coding on all bit planes of coefficients after quantization;
   said field-based coding process is to perform the 9×7 wavelet transform on each field image, perform a quantization process using a quantization step number calculated based on the scaling factor designated by the user and a basic quantization step number with respect to each subband of each component, and perform an entropy coding on all bit planes of coefficients after quantization; and wherein said selection unit is to compare a quantization step number at a high decomposition level with a threshold value so as to select the field-based coding process when the quantization step number exceeds the threshold value and select the frame-based coding process when the quantization step number does not exceed the threshold value.

2. The coding apparatus as claimed in claim 1, wherein the basic quantization step number is acquired from a predetermined constant and a number determined by normalization for maximizing a peak signal to noise ratio (PSNR) under usage of a nonreversible component transform.

* * * * *